(12) United States Patent
Shiraishi et al.

(10) Patent No.: US 6,501,585 B2
(45) Date of Patent: *Dec. 31, 2002

(54) MULTI-BEAM EXPOSURE APPARATUS

(75) Inventors: Takashi Shiraishi, Kawasaki; Masao Yamaguchi, Funabashi; Yasuyuki Fukutome, Tokyo, all of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 18 days.

(21) Appl. No.: 09/402,127

(22) PCT Filed: Dec. 4, 1998

(86) PCT No.: PCT/JP98/05495

§ 371 (c)(1),
(2), (4) Date: Sep. 30, 1999

(65) Prior Publication Data

US 2002/0039221 A1 Apr. 4, 2002

(30) Foreign Application Priority Data

Dec. 26, 1997 (JP) .............................................. 9-366815

(51) Int. Cl.⁷ ............................................. G02B 26/08
(52) U.S. Cl. ........................ 359/204; 359/216; 250/236
(58) Field of Search ................................. 359/204–226, 359/15–19, 831, 837; 250/234–236; 347/233, 241–244

(56) References Cited

U.S. PATENT DOCUMENTS 5,715,078 A  2/1998 Shiraishi ...................... 359/204
5,734,489 A  3/1998 Shiraishi et al. ............ 359/205
5,751,462 A  5/1998 Shiraishi et al.

FOREIGN PATENT DOCUMENTS

JP  3-177808  8/1991
JP  5-45744   2/1993

*Primary Examiner*—James Phan
(74) *Attorney, Agent, or Firm*—Foley & Lardner

(57) ABSTRACT

The invention is structured such as to improve a multi-beam exposure apparatus for scanning a plurality of beams, and provides an exposure apparatus in which no color shifting or no shading and no spread of a line is generated by reducing a mutual shifting of the respective beams so as to accurately overlap an image. A multi-beam exposure apparatus according to the invention has an optical element in the middle of an optical path between an image forming lens disposed between an optical deflecting apparatus and an image surface, and a light detector for detecting a horizontal synchronism, the optical element being structured such as to change an emitting angle in correspondence to a change of a wavelength due to a temperature change of a laser beam from a light source with respect to a main scanning direction and to shift a beam position at the same amount as a position shifting amount generated by an image forming lens according to a difference of a wavelength and in an opposite direction thereto, thereby guiding the beam to the same position on a detecting surface of the light detector for detecting the horizontal synchronism even in the case that wavelengths of the light beams from the light sources which emit two laser beams at every color separated into color components change according to a change of the temperature.

42 Claims, 8 Drawing Sheets

MULTI-BEAM EXPOSURE APPARATUS

TECHNICAL FIELD

The present invention relates to a multi-beam exposure apparatus scanning a plurality of light beams and usable for a plural drum type color printer apparatus, a plural drum type color copier, a multicolor printer, a multicolor copier, a monochromatic high speed laser printer, a monochromatic high speed digital copier and the like.

BACKGROUND ART

For example, in an image forming apparatus such as a color printer apparatus, a color copying apparatus which employs an image forming unit including a plurality of photosensitive drums, there is employed an exposure apparatus which supplies a plurality of light beams having the number the same as the number of plural image data corresponding to separated color components, that is, at least the number of image forming units.

This kind of exposure apparatus has a plurality of semiconductor laser elements emitting a predetermined number of light beams corresponding to the image data at each of the separated color components, a first lens group stopping down a cross sectional beam diameter of the light beam after each of the semiconductor laser elements is emitted to a predetermined size and shape, an optical deflecting apparatus operated in accordance that a recording medium holding the image formed by each of the light beams continuously reflects in a direction perpendicular to a transferred direction, a second lens group image forming the light beam deflected by the optical deflecting apparatus on a predetermined position of the recording medium, and the like. Here, in many cases, a direction in which the laser beam is deflected by the optical deflecting apparatus is indicated to be a main scanning direction, and a direction in which the recording medium is transferred, that is, a direction perpendicular to the main scanning direction is indicated to be a sub scanning direction.

The exposure apparatus mentioned above is classified into an embodiment which employs a plurality of exposure apparatuses corresponding to each of the image forming units according to the applied image forming apparatus and an embodiment which employs a multi-beam exposure apparatus capable of supplying a plurality of light beams by means of one exposure apparatus. In this case, in recent days, in order to increase an image forming speed and improve a resolution, there has been also proposed a high speed printer apparatus capable of forming an image having a high resolution and forming an image at a high speed by exposing image data having the same color in a parallel manner.

However, in the exposure apparatus mentioned above, when a rotational speed of the reflection surface of the optical deflecting apparatus is increased in order to increase the speed of the image forming apparatus and improve the resolution, it is necessary to employ an expensive bearing such as an air bearing which can stand against the high speed rotation on the reflection surface. On the other hand, as well as the rotational speed of the motor has an upper limit, the motor capable of rotating at a high speed is expensive and a drive circuit for rotating the motor is also expensive, so that there is a problem that an increase of the rotational speed of the reflection surface corresponding to an increase of the cost can not expected. In this case, when the rotational speed of the reflection surface is increased, as a result, there is generated problems that the wind sound is increased as well as the wind damage on the reflection surface is accelerated.

On the other hand, it is possible to restrict an increase of the rotational speed of the motor when increasing the number of the reflection surfaces, however, since an image frequency is increased, there is a problem that a noise component superimposed on the image signal (image data) at a high possibility is increased. Further, when the image frequency is increased, there is a problem that various kinds of limitations are generated in designing or mounting the control circuit.

Accordingly, there has been proposed a multi-beam exposure which can reduce each of the rotational speed of the reflection surface and the image frequency by allocating a plurality of light beams to each of the separated color components and deflecting (scanning) them at one time, however, even in the case of employing the multi-beam exposure, there are various kinds of problems as mentioned below.

That is, in the multi-beam exposure, there is employed a method of using a plurality of light sources for each of the separated color components and combining the light beams emitted from each of the light sources at a color component unit so as to deflect (scan) as one light beam, and a semiconductor laser element is employed for the light source.

However, it has been known that a wavelength of the light beam (the laser beam) irradiated from the semiconductor laser element is varied in a luminescent wavelength according to a temperature of an environment in which the laser element is placed. Further, each of the semiconductor laser elements is different in a changing amount of the luminescent wavelength with respect to the temperature change. In this case, when the temperature is varied in the periphery of each of the semiconductor laser elements and levels of a change with age are different from each other in each of the laser elements, the wavelengths of the light beams emitted from the respective light sources are varied.

Further, since the characteristic of the semiconductor laser element includes a mode hopping phenomenon that the luminescent wavelength is about 1.5 nm changed with respect to the temperature change about 0.1° C., it is hard to uniformly align the luminescent wavelength of all the laser elements at a wide environmental temperature range even when aligning the luminescent wavelength under a certain condition.

As mentioned above, in the case that the luminescent wavelength of the light beam irradiated from each of the semiconductor laser elements is changed due to the temperature change, in detection of a horizontal synchronism and definition of a writing position structured such as to arrange a beam detecting sensor for detecting the horizontal synchronism, for example, at a position equivalent to a mirror surface, to detect the fact that the light beam enters into the sensor by emitting the light beam prior to a timing at which the beam passes through the sensor, and to write the image by setting that the light beam is at the same position at the detecting timing and enters into the image area after a fixed time thereafter, an oscillating angle when the light beam is guided to each of the reflection surfaces of the deflecting apparatus becomes a different angle even when the timing at which the light beam enters into the sensor is the same.

That is, since the position of the beam detecting sensor is fixed, the writing position of the image is substantially maintained to a fixed value when writing the image a fixed time after detecting the fact that the light beam enters the sensor in the case that the luminescent wavelength is changed due to the temperature change, however, at a position opposite to the writing position, at which the exposure of the image is finished, there is a problem that a twice times of change (2×Δθ) is generated when setting the change amount of the oscillating angle on each of the reflection surfaces in the deflecting apparatus when the light beam scanned to the same place by the change component of the wavelength changing due to the change of the temperature reaches, to Δθ.

This generates a phenomenon that a color is shifted, a predetermined color can not reproduced and the like, in a color printer apparatus, and there is a problem of reduction of the resolution and generation of jitter caused by changing an outer diameter and a shape of a dot (an assembly of the light beam on the photosensitive body) constituting the image, in a high speed printer apparatus.

DISCLOSURE OF INVENTION

An object of the present invention is to provide an exposure apparatus for scanning a plurality of beams, in which difference between the respective beams is reduced and an image is accurately formed, thereby preventing a color shifting or a reduction of resolution from generating.

According to the present invention, there is provided a multi-beam exposure apparatus comprising a plurality of light sources for irradiating light beams having predetermined wavelengths, pre-deflection optical means for applying a predetermined optical characteristic to the light beam irradiated from each of the light sources, deflection means for deflecting the light beam passing through the pre-deflection optical means to a first direction corresponding to a direction in which a rotatably formed reflection surface is rotated at a predetermined speed, image formation optical means for continuously image forming the light beams deflected in the first direction by the deflection means on an image surface, detecting means for detecting at least one of the light beams passing through the image formation optical means and outputting predetermined signals corresponding to the light beams, and optical elements arranged between the deflection means and the detecting means and changing an emission angle in correspondence to a change of a wavelength of the light irradiated from each of a plurality of light sources.

Further, according to the present invention, there is provided a multi-beam exposure apparatus comprising a plurality of light sources, a first optical element for assembling light beams irradiated from the plurality of light sources to one light beam so as to give a predetermined characteristic, deflection means for deflecting the light beams supplied from the first optical element to a first direction corresponding to a direction in which the reflection surface is rotated, a second optical element extended out along the first direction and image forming the light beams deflected from the deflection means to a predetermined position so as to satisfy a function corresponding to a rotation of the reflection surface in the deflection means, detecting means arranged at a distance optically equivalent to a position at which the light beams passing through the second optical element reaches and in an area except an image area in which the light beam passing through the second optical element functions as an image and detecting at least one of the light beams passing through the second optical element so as to output a predetermined signal, and optical elements arranged between the second optical element and the detecting means, changing an emission angle in correspondence to a change of a wavelength of the light irradiated from the plurality of light sources due to a change of a temperature with respect to the first direction and shifting a position to which the light reaches to a direction having the same amount as a position shifting amount on the predetermined image surface generated by the second optical element due to a difference of the wavelength and having an opposite direction, thereby guiding the light having a wavelength which is changed due to a change of the temperature to the same position on the detecting surface of the detecting means in the case that the reflection surface of the deflection means has the same rotational angle.

Still further, according to the present invention, there is provided a multi-beam exposure apparatus comprising a plurality of light sources for irradiating lights having a predetermined wavelength at a predetermined temperature, pre-deflection optical means for assembling lights irradiated from the light sources to one light beam so as to give a predetermined characteristic, deflection means for deflecting a group of lights emitted from the pre-deflection optical means to a first direction, an image formation lens extended out in the first direction and image forming the lights deflected by the deflection means on a predetermined image surface at a uniform speed, detecting means defined at a distance optically equivalent to the predetermined image surface, arranged at a position in which the lights passing through the lens reaches and in an area except an image area among the predetermined image surface and detecting the lights passing through the lens so as to output a predetermined signal, and optical elements arranged on an optical path between the lens and the detecting means, changing an emission angle in correspondence to a change of a wavelength of the light irradiated from the plurality of light sources due to a change of a temperature with respect to the first direction and shifting a position to which the light reaches to a direction having the same amount as a position shifting amount generated by the lens due to a difference of the wavelength and having an opposite direction, thereby reducing a difference of the image of a main scanning direction position at a position opposite to a writing position in the first direction generated by a difference of the writing timing caused by the light being different from a reference wavelength in the wavelength.

BEST MODE OF CARRYING OUT THE INVENTION

Hereinafter, embodiments of the present invention will be described in detail with reference to the accompanying drawings.

Figure 1:
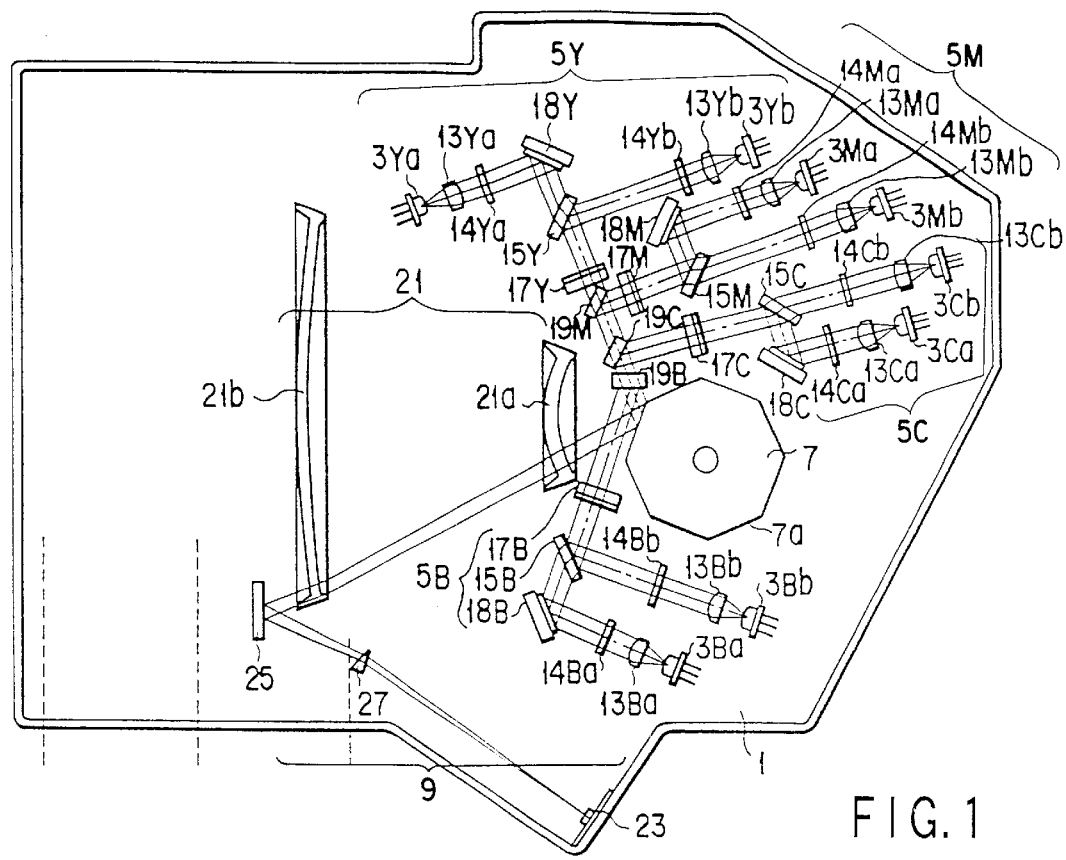
FIG. 1 is a schematic plan view showing an embodiment of a multi-beam exposure apparatus corresponding to an embodiment of the present invention.
Figure 2:
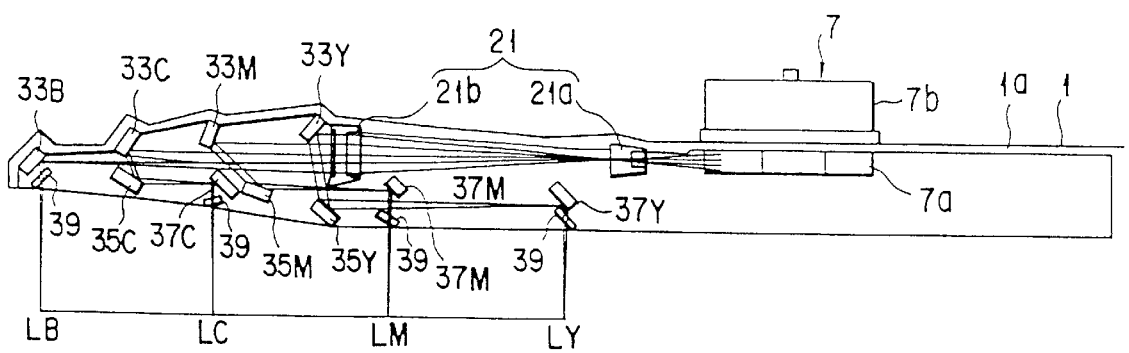
FIG. 2 is a schematic view showing a state of the exposure apparatus shown in FIG. 1 viewed from a side portion.

FIGS. 1 and 2 are schematic views which show a multi-beam exposure apparatus according to an embodiment of the present invention and assembled in an image forming apparatus for forming a color image on the basis of color separated image information, for example, separated into four color components, in which FIG. 1 is a schematic plan view in a state of removing a cover and FIG. 2 is a schematic view showing a state in the case of viewing the apparatus shown in FIG. 1 from a side portion. In this case, in the color image forming apparatus employing the image information corresponding to four colors as mentioned above, in order to display an optional color according to a subtractive mixture, since there is generally employed four kinds of image information separated into each of colors comprising yellow (Y), magenta (M), cyan (C) and black (B, however, the black is used for inking performed by replacing an image area displaying a black obtained by overlapping the yellow, the magenta and the cyan by a single color and for forming a black monochromatic image such as a document or the like) and four sets of various mechanisms for forming the image at each of the color components in correspondence to each of Y, M, C and B, the structure is made such as to identify the image information at each of the color components and the corresponding mechanism by adding Y, M, C and B to each of reference numerals. Further, since an image forming apparatus main body, a control portion thereof (for controlling an operation), a treatment of the image information signal and the like have been already disclosed in U.S. Pat. No. 5,715,078 which is a prior application filed by the same inventors of the present application and was already registered (date of registration is Feb. 3, 1998), the detailed description thereof will be omitted in this specification.

A multi-beam exposure apparatus 1 has light sources 3Y, 3M, 3C and 3B for respectively outputting light beams toward four image forming portions of an image forming apparatus main body (not shown), and an optical deflecting apparatus 7 as deflecting means for deflecting (scanning) the light beams irradiated from the respective light sources 3 (Y, M, C and B) toward an image surface arranged at a predetermined position (that is, a photosensitive drum provided in each of four image forming portions of the image forming apparatus main body (not shown)) at a predetermined linear speed. In this case, a pre-deflection optical system 5 is arranged between the optical deflecting apparatus 7 and the light source 3 and a post-deflection optical system 9 is arranged between the optical deflecting apparatus 7 and the image surface (not shown), respectively. Further, a direction in which the laser beam is deflected (scanned) by the optical deflecting apparatus 7 is indicated as a main scanning direction, and a direction perpendicular to each of the main scanning direction and an axis corresponding to a reference for a deflecting operation which the optical deflecting apparatus applies to the laser beam so that the laser beam scanned (deflected) by the optical deflecting apparatus becomes in the main scanning direction is indicated as a sub scanning direction. Accordingly, the sub scanning direction of the laser beam deflected by the multi-beam exposure apparatus 1 is a direction in which a recording sheet is transferred in the image forming apparatus main body (not shown), and coincides with a direction in which a photosensitive drum (not shown) is rotated. Further, the main scanning direction corresponds to a direction perpendicular to a direction in which the recording sheet (not shown) is transferred (an axial direction of the photosensitive drum (not shown)).

The respective light sources 3 (Y, M, C and B) are structured such that two semiconductor laser elements 3Ya and 3Yb, 3Ma and 3Mb, 3Ca and 3Cb, and 3Ba and 3Bb are placed in a predetermined arrangement at respective separated color components Y (yellow), M (magenta), C (cyan) and B (black).

The pre-deflection optical systems 5 are structured such as to be combined to one beam by means of group combining mirrors 15Y, 15M, 15C and 15B for combining laser beams LYa and LYb, LMa and LMb, LCa and LCb, and LBa and LBb respectively emitted from the lasers 3Ya and 3Yb, 3Ma and 3Mb, 3Ca and 3Cb, and 3Ba and 3Bb corresponding to the respective light sources into one laser beam at the respective color components and to be further combined to substantially one laser beam L {(Lya+Lyb)=LY, (LMa+LMb)=LM, (LCa+LCb)=LC and (LBa+LBb)=LB} with respect to the main scanning direction by respective color combining mirrors 19M, 19C and 19B, thereby being guided toward the light deflecting apparatus.

In this case, finite focal lenses 13, aperture tops 14 and cylinder lenses 17 are provided between the light sources 3 (Y, M, C and B) and the group combining mirrors 15 (Y, M, C and B), however, since each of the finite focal lenses 13, the aperture stops 14 and the cylinder lenses 17 has been already disclosed in U.S. Pat. No. 5,734,489 (date of registration is Mar. 31, 1998) which is a prior application filed by the same inventors of the present application and was already registered, the detailed description will be omitted in this specification.

The optical deflecting apparatus 7 has a polyhedral mirror main body 7a, for example, in which eight flat reflection surfaces (flat reflection mirrors) are arranged in a regular polygonal shape, and a motor 7b for rotating the polyhedral mirror main body 7a in the main scanning direction at a predetermined speed. Further, the polyhedral mirror main body 7a is integrally formed with a rotary shaft of the motor 7b. In this case, with respect to the optical deflecting apparatus 7, since the explanation has been in detail disclosed in U.S. Pat. No. 5,734,489 (date of registration is Mar. 31, 1998) previously mentioned, the detailed description will be omitted in this specification.

The post-deflection optical system 9 has a two-assembled image formation lens 21 for optimizing a shape and a position of the laser beam L (Y, M, C and B) deflected (scanned) by the rotary polyhedral mirror 7a of the optical deflecting apparatus 7 on the image surface, that is, first and second image formation lenses 21a and 21b, an optical detector for a horizontal synchronism 23 which detects each of the laser beams L so as to align the horizontal synchronism of the respective laser beams L (Y, M, C and B) after being deflected in the optical deflecting apparatus 7 and passing through the two-assembled image formation lens 21, a reflecting mirror 25 for a horizontal synchronism which reflects the respective laser beams L toward the optical detector 23 for the horizontal synchronism, an optical path correction element 27 arranged between the reflecting mirror 25 and the optical detector 23 for detecting the horizontal synchronism and capable of substantially coinciding the respective laser beams L reflected toward the optical detector 23 for detecting the horizontal synchronism by the reflecting mirror 25 with incidental positions on a detecting surface of the optical detector 23 for detecting the horizontal synchronism even in the case that the wavelengths of the respective laser beams L are changed due to the change of the temperature of the portion (environment) in which the laser elements (the light sources 3 (Y, M, C and B)) are arranged, a plurality of mirrors 33Y (yellow No. 1), 35Y (yellow No. 2), 37Y (yellow No. 3), 33M (magenta No. 1), 35M (magenta No. 2), 37M (magenta No. 3), 33C (cyan No. 1), 35C (cyan No. 2), 37C (cyan No. 3) and 33B (black for exclusive use) which guide the respective laser beams L (Y, M, C and B) emitted from the second image formation lens 21b of the two-assembled image formation lens 21 to the photosensitive drums (the image surfaces) (not shown) corresponding to the respective laser beams L, and dustproof glasses 39 (Y, M, C and M) which perform a dustproof of the optical scanning apparatus 1 including a lot of optical elements mentioned above. In this case, since reasons affecting optical characteristics such as the optical characteristics, the positional relation and the like of each of the two-assembled image formation lens 21 (the first lens 21a and the second lens 21b), the optical detector 23 for the horizontal synchronism, the reflecting mirror 25 for the horizontal synchronism, the respective mirrors 33Y, 35 (Y, M and C), 37 (Y, M and C) and 33B, and the respective dust-proof glasses 39 (Y, M, C and M) mentioned here are common to those of U.S. Pat. No. 5,734,489 (date of registration is Mar. 31, 1998) previously shown, the detailed description will be omitted in this specification.

Next, a description will be given in detail of the pre-deflection optical system 5 between each of the lasers 3Ya, 3Yb, 3Ma, 3Mb, 3Ca, 3Cb, 3Ba, 3Bb constituting the respective light sources 3 (Y, M, C and B) and the optical deflecting apparatus 7 at each of the lasers.

The respective light sources 3Y, 3M, 3C and 3B also have a yellow No. 1 laser 3Ya and a yellow No. 2 laser 3Yb for emitting the laser beam LY, a magenta No. 1 laser 3Ma and a magenta No. 2 laser 3Mb for emitting the laser beam LM, a cyan No. 1 laser 3Ca and a cyan No. 2 laser 3Cb for emitting the laser beam LC, and a black No. 1 laser 3Ba and a black No. 2 laser 3Bb for emitting the laser beam LB, respectively. In this case, the laser beams LYa and LYb, LMa and LMb, LCa and LCb, and LBa and LBb which are respectively emitted from the lasers 3Ya, 3Yb, 3Ma, 3Mb, 3Ca, 3Cb, 3Ba and 3Bb constituting the respective light sources are respectively combined by group combining mirrors (half mirrors, that is, the first combining mirrors) 15Y, 15M, 15C and 15B which reflect about 50% of the incidental laser beams and transmit about 50% thereof at the same color component, and combined by color combining mirrors (second combining mirrors) 19M, 19C and 19B, thereby being guided toward the optical deflecting apparatus 7. Further, before the laser beams LYa, LMa, LCa and LBa respectively emitted from the lasers 3Ya, 3Ma, 3Ca and 3Ba constituting the respective light sources are combined with the respective laser beams LYb, LMb, LCb and LBb constituting a pair by the half mirrors 15Y, 15M, 15C and 15B, the reflecting angles of the corresponding galvano mirrors 18Y, 18M, 18C and 18B are set to predetermined angles, whereby an interval in a sub scanning direction is set to a predetermined interval.

The pre-deflection optical system 5 includes a finite focal lens 13 which applies a predetermined focusing characteristic to the laser beam L emitted from the laser 3, an aperture stop 14 which applies an optional cross sectional beam shape to the laser beam L passing through the finite focal lens 13, a half mirror (the first combining mirror) 15 and a cylinder lens 17 which further applies a predetermined focusing characteristic to the laser beam L combined by the half mirror 15 with respect to the sub scanning direction, and aligns the cross sectional beam shape of the laser beam L emitted from the laser 3 to a predetermined shape so as to guide to the reflection surface of the optical deflecting apparatus 7. In this case, for the finite focal lens 13, there is used a lens, for example, obtained by adhering ultraviolet hardened type plastic lenses (not shown) onto at least one surface of a laser incidental surface and an emitting surface of a non-spherical glass lens or a spherical glass lens (or integrally forming plastic lenses (not shown)). Further, the laser 3, the finite focal lens 13 and the aperture stop 14 are integrally held by the lens holder 11 described below with reference to FIG. 3.

Figure 3:
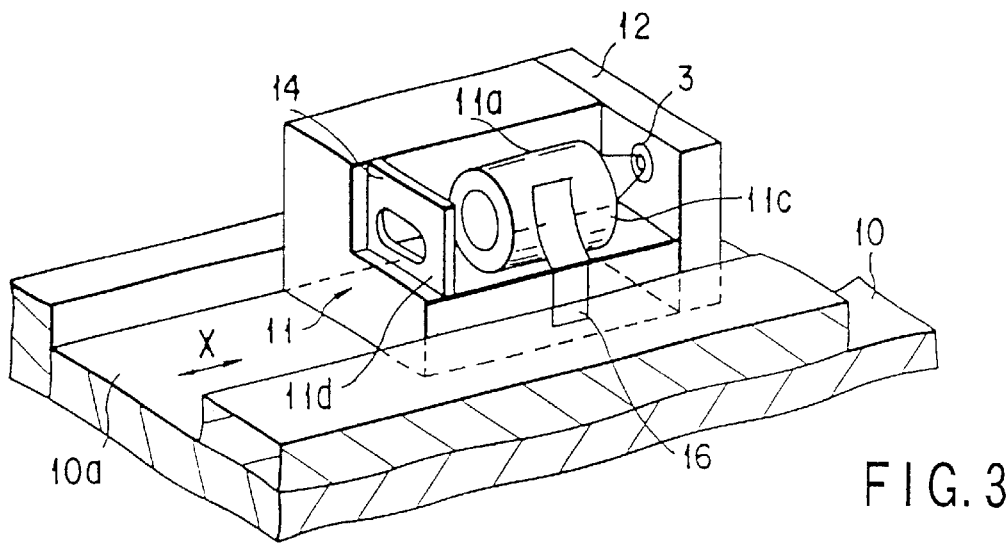
FIG. 3 is a schematic view showing a structure of a lens holder and a light source used for the exposure apparatus shown in FIGS. 1 and 2.

As shown in FIG. 3 (which representatively shows the lens holder 11 corresponding to the optional laser 3), the lens holder 11 is, for example, made of an aluminum die casting having a high processing accuracy and on the contrary having a small shape change with respect to the change of the temperature, and is arranged on a recess portion 10a of a base plate 10 for holding the elements of the pre-deflection optical system 5 in such a manner as to move along a direction of an arrow x on the recess portion 10a. In this case, the base plate 10 is positioned on a middle base 1a of the exposure apparatus 1.

The lens holder 11 has a holder main body 11a which holds the laser 3 fixed to an aluminum die casting laser holder 12 formed by an aluminum substantially equal to the material of the lens holder 11 and the finite focal lens 13 while maintaining them at a predetermined interval, and holds the finite focal lens 13 at a position a predetermined distance apart from a light emitting point of the laser 3, that is, a position in which the laser holder 12 and the holder main body 11a are brought into contact with each other. That is, the finite focal lens 13 is a lens with a cylindrical flange in which a flange portion is formed in a cylindrical shape, and is fixed to the lens holder 11 by being pressed to a side surface 11c of the lens holder by a plate spring 16 arranged in such a manner as to be pressurized toward the side surface 11c of the holder main body 11a from a side portion of a bottom portion 11b in the holder main body 11a of the lens holder 11. Accordingly, the finite focal lens 13 can move the holder main body 11a along an optical axis o directing toward the cylinder lens 17 after passing through the finite focal lens 13 from the laser 3, and is fixed to the lens holder 11 so that the interval with respect to the laser 3 fixed to the laser supporting body 12 becomes a predetermined interval.

Again with reference to FIGS. 1 and 2, the half mirror 15 (Y, M, C and B) is structured such that, for example, a metal membrane is vacuum evaporated on one surface of a parallel flat glass formed so as to have a thickness t=5 mm, whereby a transmittance and a reflectivity are controlled to a predetermined magnitude, and the reflecting angles of the main scanning direction and the sub scanning direction are respectively set by a mirror holding mechanism 20 described below with reference to FIG. 4 on the basis of horizontal synchronism and beam position signals obtained by detecting one laser beam, for example, the laser beams L (Y, M, C and B)a or L (Y, M, C and B)b among two laser beams emitted from the respective lasers 3 (any one of Y, M, C and B)a and the lasers 3 (any one of Y, M, C and B)b by the horizontal synchronism detector 23.

In this case, the respective laser beams LYa, LMa, LCa and LBa are respectively transmitted through the half mirrors 15 (Y, M, C and B) as mentioned above, and the respective laser beams LYb, LMb, LCb and LBb emitted from the lasers 3Yb, 3Mb, 3Cb and 3Bb are reflected by the half mirrors 15 (Y, M, C and B). further, a number at which the respective laser beams L (Ya, Yb, Ma, Mb, Ca, Cb, Ba and Bb) transmit through the half mirrors 15 (Y, M, C and B) is 1 or 0 as mentioned above. Specifically, LBa, LMa, LCa and LYa transmit through the half mirrors 15 (Y, M, C and B) at only one time, and the other laser beams LBb, LMb, LCb and LYb are reflected by the half mirrors 15 (Y, M, C and B). In this case, the respective half mirrors 15 (Y, M, C and B) are inclined in the same direction as that of the laser beams LBa, LMa, LCa and LYa after transmitting through the respective half mirrors 15 (Y, M, C and B) and moving toward the optical deflecting apparatus 7 at the same amount (angle). In this case, angles U at which the respective half mirrors 15 (Y, M, C and B) are inclined are respectively set to 45 degrees.

In this case, it is possible to set the outputs of the laser elements 3Ya and 3Yb, 3Ma and 3Mb, 3Ca and 3Cb, and 3Ba and 3Bb of the respective light sources 3 (Y, M, C and B) to be substantially the same by setting a ratio between the reflectivity and the transmittance of the respective half mirrors 15 (Y, M, C and B). Accordingly, it is possible to make the output on the image forming surface the same value, and it is easy to unify the image forming characteristic of the respective laser beams L (Ya, Yb, Ma, Mb, Ca, Cb, Ba and Bb).

Figure 4:
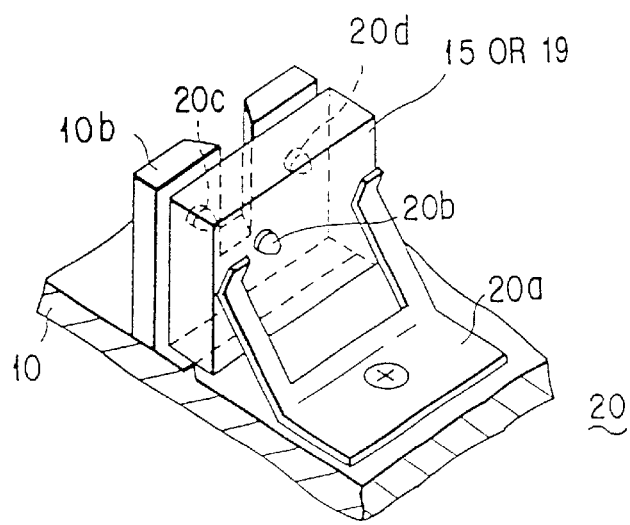
FIG. 4 is a schematic view explaining a mechanism for holding a half mirror, a half fixed mirror and a color combination mirror in the exposure apparatus shown in FIGS. 1 and 2.

FIG. 4 (representatively showing an optional laser beam) is a schematic view explaining a mirror holding mechanism 20 which can adjust an incline of a light incidental surface and a light emitting surface (light reflecting surface) of the half mirrors 15 (Y, M, C and B) for combining three pieces×two groups lasers 3 (any one of Y, M, C and B)a and the lasers 3 (any one of Y, M, C and B)b constituting a pair (together with the lasers 3 (any one of Y, M, C and B)a in a direction with respect to each of the main scanning direction and the sub scanning direction.

As shown in FIG. 4, the half mirror 15 is fixed to a predetermined position of the base plate 10 by a projection-like mirror holding portion 10b integrally formed with the base plate 10 and a plate spring 20a arranged in such a manner as to be pressurized toward the mirror holding portion 10b so as to indicate an optional incline with respect to the optical axis o.

The mirror holding mechanism 20, in particular, has a first adjusting screw 20b provided in a side near the bottom portion of the mirror holding portion 10b, that is, the base plate 10, and second and third adjusting screws 20c and 20d provided in a portion a predetermined distance apart from the base plate 10, and it is possible to set an incline of the mirror 15 pressed by the pressing force from the plate spring 20a to a direction and an angle set according to feeding amounts of three screws 20b, 20c and 20d by independently setting the feeding amounts of the respective screws 20b, 20c and 20d. In this case, the plate spring 20a is separated into two web-like areas except the portion fixed to the base plate 10 so as to be brought into contact only with an outer peripheral portion of the mirror 15, and the mirror holding portion 10b is structured such as to be notched except an area in which 20b, 20c and 20d are provided, thereby making it possible to input or reflect the laser beam from both of the mirror holding portion 10b and the plate spring 20a.

Next, a description will be in detail given of each of the laser beams LYa and LYb, LMa and LMb, LCa and LCb, and LBa and LBb guided to the reflecting surface of the optical deflecting apparatus 7 and deflected (scanned) on the reflecting surface and the post-deflection optical system 9 positioned between the optical deflecting apparatus 7 and the image surface at every lasers.

The laser beams LYa and LYb guided to the optical deflecting apparatus 7 are deflected according to rotation of the respective reflecting surfaces of the polyhedral mirror 7a in the optical deflecting apparatus 7 at a substantially constant speed, and input to the post-deflection optical system 9, that is, the incidental surface of the first image forming lens 21a in the two-assembled image forming lens 21 at a predetermined angle.

In the below description, the laser beams LYa and LYb are applied predetermined focusing characteristic and directivity by the second image forming lens 21b so that the shape and the magnitude of the beam spot on the surface of the photosensitive drum (not shown) become predetermined shape and magnitude, successively reflected by the mirrors 33Y and 35Y and reflected by the mirror 37Y at a predetermined angle, thereby passing through the dust-proof glass 39Y so as to be irradiated onto the photosensitive drum (image surface) (not shown).

Similarly, the respective laser beams LMa, LMb, and LCa and LCb are passed through the second image forming lens 21b, successively reflected by the mirrors 33M, 33C, 35M and 35C and reflected by the mirrors 37M and 37C at a predetermined angle, thereby passing through the dust-proof glasses 39M and 39C so as to be irradiated onto the photosensitive drum (not shown).

The laser beams LBa and LBb are applied predetermined focusing characteristic and directivity by the second image forming lens 21b in the same manner as that of the laser beam corresponding to the other colors mentioned above, and reflected only by the mirror 33B at a predetermined angle, thereby passing through the dust-proof glass 39M so as to be irradiated onto the photosensitive drum (not shown).

In this case, the third mirrors 37 (Y, M and C) provided in correspondence to the respective laser beams L (Y, M and C) are held by a parallelism adjusting mechanism (not shown) in such a manner as to reflect the laser beams L (Y, M and C) in an optional direction, and are formed in such a manner as to set a changing amount of the beam spot diameters at both end portions in the longitudinal direction of the image surface to an optional magnitude.

Next, a description will be in detail given of characteristics of the laser beams (Y, M, C and B) guided to the photosensitive drum (the image surface) (not shown) from the multi-beam exposure apparatus 1 mentioned above.

The laser beam LYa emitted from the yellow No. 1 laser 3Ya is converted into a direction substantially parallel to each of the main scanning direction and the sub scanning direction by the finite focal lens 13Ya, and passes through the aperture stop 14Ya, whereby a predetermined cross sectional beam shape is applied thereto.

The laser beam LYa to which the predetermined cross sectional beam shape is applied after passing through the aperture stop 14Ya is reflected to a predetermined direction by the semi-stationary mirror 18Y having a reflecting surface capable of being set to an optional direction, and guided to the half mirror 15Y. In this case, the semi-stationary mirror 18 is a galvano mirror (a mirror held in such a manner as to move at a very small amount due to a power force) in which an angle of the reflecting surface can be set in an optional direction by a fixing apparatus similar to the mirror holding mechanism 20 already explained with reference to FIG. 5 or an ultrasonic motor (not shown).

The laser beam LYa guided to the half mirror 15Y transmits through the half mirror 15Y, is overlapped with the laser beam LYb from the yellow No. 2 laser 3Yb mentioned below by the half mirror 15Y, and is guided to the cylinder lens 17Y as the laser beam LY. The laser beam LY guided to the cylinder lens 17Y is further focused with respect to the sub scanning direction by the cylinder lens 17Y and is guided to the polyhedral mirror 7a of the optical deflecting apparatus 7. In this case, the half mirror 15Y is arranged so that the reflecting angle in the sub scanning direction becomes a predetermined angle with respect to the laser beam LYa. Further, the incline in the sub scanning direction of the half mirror 15Y is set on the basis of the beam position data obtained by the horizontal synchronism and sub scanning beam position detector 23 in the post-deflection optical system 9 mentioned below.

The laser beam LYb emitted from the yellow No. 2 laser 3Yb is converted into a direction substantially parallel to each of the main scanning direction and the sub scanning direction by the finite focal lens 13Yb, and passes through the aperture stop 14Yb, whereby a predetermined cross sectional beam shape is applied thereto. The laser beam LYb to which the predetermined cross sectional beam shape is applied after passing through the aperture stop 14Yb is reflected by the half mirror 15Y, overlapped with the laser beam LYa from the yellow No. 1 laser 3Ya mentioned above by the half mirror 15Y, and guided to the polyhedral mirror 7a of the optical deflecting apparatus 7.

The laser beam LMa emitted from the magenta No. 1 laser 3Ma is converted into a direction substantially parallel to each of the main scanning direction and the sub scanning direction by the finite focal lens 13Ma, and passes through the aperture stop 14Ma, whereby a predetermined cross sectional beam shape is applied thereto. The laser beam LMa to which the predetermined cross sectional beam shape is applied after passing through the aperture stop 14Ma is guided to the half mirror 15M. The laser beam LMa guided to the half mirror 15M transmits through the half mirror 15M, is overlapped with the laser beam LMb from the magenta No. 2 laser 3Mb mentioned below by the half mirror 15M, and is guided to the cylinder lens 17M as the laser beam LM. The laser beam LM guided to the cylinder lens 17M is further focused with respect to the sub scanning direction by the cylinder lens 17M and is guided to the polyhedral mirror 7a of the optical deflecting apparatus 7. In this case, the half mirror 15M is arranged so that the reflecting angle in the sub scanning direction becomes a predetermined angle with respect to the laser beam LMa. Further, the incline in the sub scanning direction of the half mirror 15M with respect to the laser beam corresponding to a reference in which the reflecting angle in the sub scanning direction is set is set on the basis of the beam position data obtained by the horizontal synchronism and sub scanning beam position detector 23 in the post-deflection optical system 9 mentioned below.

The laser beam LMb emitted from the magenta No. 2 laser 3Mb is converted into a direction substantially parallel to each of the main scanning direction and the sub scanning direction by the finite focal lens 13Mb, and passes through the aperture stop 14Mb, whereby a predetermined cross sectional beam shape is applied thereto. The laser beam LMb to which the predetermined cross sectional beam shape is applied after passing through the aperture stop 14Mb is reflected by the half mirror 15M, overlapped with the laser beam LMa from the magenta No. 1 laser 3Ma mentioned above by the half mirror 15M, and guided to the polyhedral mirror 7a of the optical deflecting apparatus 7.

The laser beam LCa emitted from the cyan No. 1 laser 3Ca is converted into a direction substantially parallel to each of the main scanning direction and the sub scanning direction by the finite focal lens 13Ca, and passes through the aperture stop 14Ca, whereby a predetermined cross sectional beam shape is applied thereto. The laser beam LCa to which the predetermined cross sectional beam shape is applied after passing through the aperture stop 14Ca is guided to the half mirror 15C. The laser beam LCa guided to the half mirror 15C transmits through the half mirror 15C, is overlapped with the laser beam LCb from the cyan No. 2 laser 3Cb mentioned below by the half mirror 15C, and is guided to the cylinder lens 17C as the laser beam LC. The laser beam LC guided to the cylinder lens 17C is further focused with respect to the sub scanning direction by the cylinder lens 17C and is guided to the polyhedral mirror 7a of the optical deflecting apparatus 7. In this case, the half mirror 15C is arranged so that the reflecting angle in the sub scanning direction becomes a predetermined angle with respect to the laser beam LCa. Further, the incline in the sub scanning direction of the half mirror 15C corresponding to a reference in which the reflecting angle in the sub scanning direction is set is set on the basis of the beam position data obtained by the horizontal synchronism and sub scanning beam position detector 23 in the post-deflection optical system 9 mentioned below.

The laser beam LCb emitted from the cyan No. 2 laser 3Cb is converted into a direction substantially parallel to each of the main scanning direction and the sub scanning direction by the finite focal lens 13Cb, and passes through the aperture stop 14Cb, whereby a predetermined cross sectional beam shape is applied thereto. The laser beam LCb to which the predetermined cross sectional beam shape is applied after passing through the aperture stop 14Cb is reflected by the half mirror 15C, overlapped with the laser beam LCa from the cyan No. 1 laser 3Ca mentioned above by the half mirror 15C, and guided to the polyhedral mirror 7a of the optical deflecting apparatus 7.

The laser beam LBa emitted from the black No. 1 laser 3Ba is converted into a direction substantially parallel to each of the main scanning direction and the sub scanning direction by the finite focal lens 13Ba, and passes through the aperture stop 14Ba, whereby a predetermined cross sectional beam shape is applied thereto. The laser beam LBa to which the predetermined cross sectional beam shape is applied after passing through the aperture stop 14Ba is reflected to a predetermined direction by the semi-stationary mirror 18B having a reflecting surface capable of being set to an optional direction, and guided to the half mirror 15B.

The laser beam LBa guided to the half mirror 15B transmits through the half mirror 15B, is overlapped with the laser beam LBb from the black No. 2 laser 3Bb mentioned below by the half mirror 15B, and is guided to the cylinder lens 17B. The laser beam LB guided to the cylinder lens 17B is further focused with respect to the sub scanning direction by the cylinder lens 17B and is guided to the polyhedral mirror 7a of the optical deflecting apparatus 7. In this case, the half mirror 15B is arranged so that the reflecting angle in the sub scanning direction becomes a predetermined angle with respect to the laser beam LBa. Further, the incline in the sub scanning direction of the half mirror 15B corresponding to a reference in which the reflecting angle in the sub scanning direction is set is set on the basis of the beam position data obtained by the horizontal synchronism and sub scanning beam position detector 23 in the post-deflection optical system 9 mentioned below.

The laser beam LBb emitted from the black No. 2 laser 3Bb is converted into a direction substantially parallel to each of the main scanning direction and the sub scanning direction by the finite focal lens 13Bb, and passes through the aperture stop 14Bb, whereby a predetermined cross sectional beam shape is applied thereto. The laser beam LBb to which the predetermined cross sectional beam shape is applied after passing through the aperture stop 14Bb is reflected by the half mirror 15B, overlapped with the laser beam LBa from the black No. 1 laser 3Ba mentioned above by the half mirror 15B, and guided to the polyhedral mirror 7a of the optical deflecting apparatus 7.

In this case, the semi-stationary mirrors 18Y and 18B positioned on the optical path of the laser beam LYa emitted from the yellow No. 1 laser 3Ya and the laser beam LBa emitted from the black No. 1 laser 3Ba are arranged in such a manner as to change the reflecting direction and the angle of the laser beam in each of the main scanning direction and the sub scanning direction, for example, by the mirror holding mechanism similar to the mirror holding mechanism 20 for holding the half mirror 15 shown in FIG. 4.

The 3 pieces×2 groups=6 pieces laser beams LM, LC and LB combined by the half mirrors 15M, 11C and 11B correspond to the respective laser beams L (M, C and B), and in the same manner as that of the half mirrors 15 (Y, M, C and B) and the semi-stationary mirrors 18Y and 18B, are returned to a predetermined direction by the color combining mirrors (that is, the second combining mirrors) 19M, 19C and 19B in such a manner as to change the reflecting direction and the angle of the laser beam in each of the main scanning direction and the sub scanning direction by the mirror holding mechanism similar to the mirror holding mechanism 20 for holding the half mirror 15 shown in FIG. 4, so as to be guided to the optical deflecting apparatus 7.

In this case, the laser beam LY obtained by combining two laser beams LYa and LYb by means of the half mirror 15Y is not reflected on the middle, and is linearly guided toward the optical deflecting apparatus 7. That is, the laser beam LY passes through a space which is not shielded by any mirrors disposed at a distance in a direction of the rotary shaft of the reflecting surface of the polyhedral mirror 7a in the optical deflecting apparatus 7 with respect to each of the color combining mirrors 19M, 19C and 19B, so as to be guided to the optical deflecting apparatus 7.

Then, four colors=four pieces laser beams L combined into one piece by the pre-deflection optical system 5 mentioned above, guided to the optical deflecting apparatus 7 and deflected (scanned) on each of the reflecting surfaces of the optical deflecting apparatus 7 are applied a predetermined characteristic by the post-deflection optical system 9, and are image formed at a predetermined position on the respective photosensitive drum 58.

In this case, according to any one of a time except writing the image, for example, a time before beginning to write the image data after the image forming apparatus is started, or a time on the way of continuously forming the image, or a timing that printing does not affect on the sheet by the scanning optical system, or a fixed time interval, or any optional combination thereof, with respect to the sub scanning direction, a distance between the laser beams comprising a pair which are guided to the respective image forming portion, that is, the relative positional relations between the LYa and Lyb, LMa and LMb, LCa and LCb, and LBa and LBb are measured, and on the basis of the measured results, the respective laser beam positions and the reflecting angles of the galvano mirrors 18Y, 18M, 18C and 18B are controlled so that the relative positional relations thereof become a predetermined interval. Further, also with respect to the main scanning direction, according to any one of a time except writing the image, for example, a time before beginning to write the image data after the image forming apparatus is started, or a timing on the way of continuously forming the image and that printing does not affect on the sheet by the scanning optical system, or a fixed time interval, values obtained by measuring a distance between the laser beams which are guided to the respective image forming portion, that is, the relative passing timing between the LYa and LYb, LMa and LMb, LCa and LCb, and LBa and LBb are kept, and on the basis of the measured results, the light emitting timing of the light sources 3Ya and 3Yb, 3Ma and 3Mb, 3Ca and 3Cb, and 3Ba and 3Db is controlled so as to cancel the difference of the passing timing.

Further, according to the result obtained by detecting the difference of the image written by the respective image forming portions (not shown), the difference in the main scanning direction and the difference in the sub scanning direction between the laser beams LY (=LYa+LYb), LM (=LMa+LMb), LC (=LCa+LCb) and LB (=LBa+LBb) are detected by the resist sensors (not shown) of the image forming apparatus main body (not shown), so that the difference in the sub scanning direction can be corrected according to the timing of writing the image and the difference in the main scanning direction can be corrected according to the timing and the image frequency of writing the image.

In this case, as is explained in the description of the prior art, the semiconductor laser elements are respectively different in the changing amount of the emitting wavelength with respect to the temperature change. In this case, when the temperature is varied in the periphery of the respective laser elements or a difference is generated in the level of the change with age in the respective laser elements, the wavelength of the light beams outputting from the respective light sources is varied. Further, since there is a mode hopping phenomenon that the emitting wavelength is about 1.5 nm changed with respect to the temperature change about 0.1° C. as a characteristic of the semiconductor laser elements, it is hard to uniformly align the emitting wavelength of all the laser elements at a wide environmental temperature range even when aligning the emitting wavelength under a certain condition.

On the other hand, when the wavelength of the laser beam to be irradiated the laser component is changed, a difference of between the angles reflected by the lenses 21a and 21b of the laser beam (in which the wavelength is changed) and the laser beam having the reference wavelength is generated although the rotary angles of the respective reflecting surfaces of the optical deflecting apparatus 7 are the same.

In many cases, a chromatic aberration of both ends of an effective field angle of the respective lenses in the two-assembled lens 21 of the post-deflection optical system 9 is hardly "0", so that in the case that the wavelength of the laser beam irradiated from the laser component is changed, the laser beam successively passing through the respective lenses 21a and 21b of the two-assembled lens 21 in this order is input to the light detector for the horizontal synchronism 23 at a timing different from the timing at which the laser beam having the reference wavelength is input.

However, by applying the characteristics shown below to the optical path correcting element 27, in the case that the rotational angles of the respective reflecting surfaces in the optical deflecting apparatus 7 are the same, it is possible to make the positions of the laser beams on the light detecting surface of the light detector for detecting the horizontal synchronism 23 substantially equal to each other by changing the emitting angles of the laser beams irradiated from the respective laser elements 3Ya, 3Yb, 3Ma, 3Mb, 3Ca, 3Cb, 3Ba and 3Bb of the respective light sources 3 toward the light detecting surface of the light detector for detecting the horizontal synchronism 23 in correspondence to the wavelengths of the laser beams.

Figure 5:
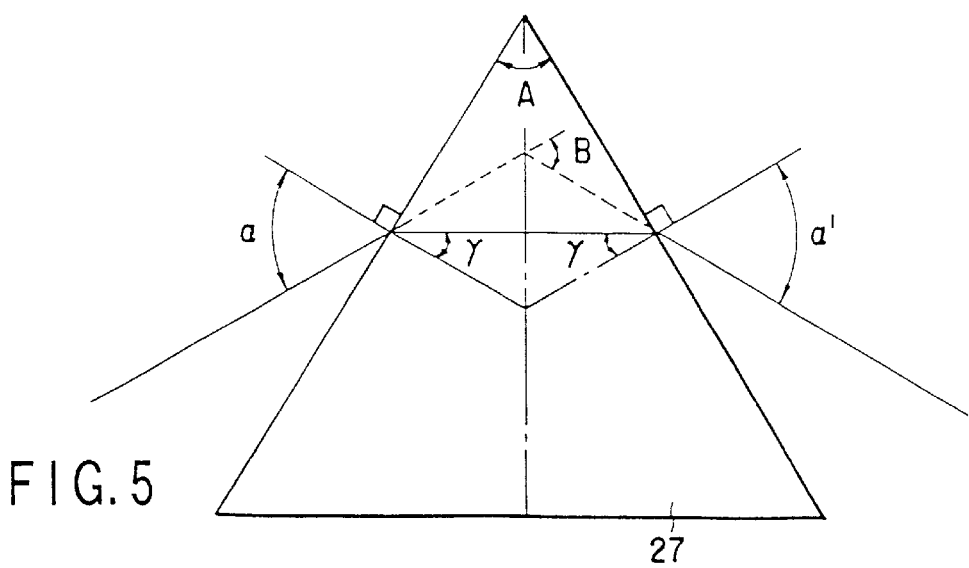
FIG. 5 is a schematic view in the case of an optical path correction element employed for the exposure apparatus shown in FIGS. 1 and 2 viewed from a cross sectional direction with respect to a light incidental surface.

In particular, by using the prism having a cross sectional shape formed in an isosceles triangle shown in FIG. 5 for the optical path correcting element 27, the wavelength of the laser beam emitted form the light source is changed according to the change of the temperature, whereby the laser beams are irradiated to the different positions so as to be reflected although the respective reflecting surfaces of the optical deflecting apparatus 7 have the same rotational angle, so that it is possible to reduce an influence of the phenomenon that the beams are actually guided to the different positions of the light detector 23 for detecting the horizontal synchronism 23 at the same timing.

Figure 6:
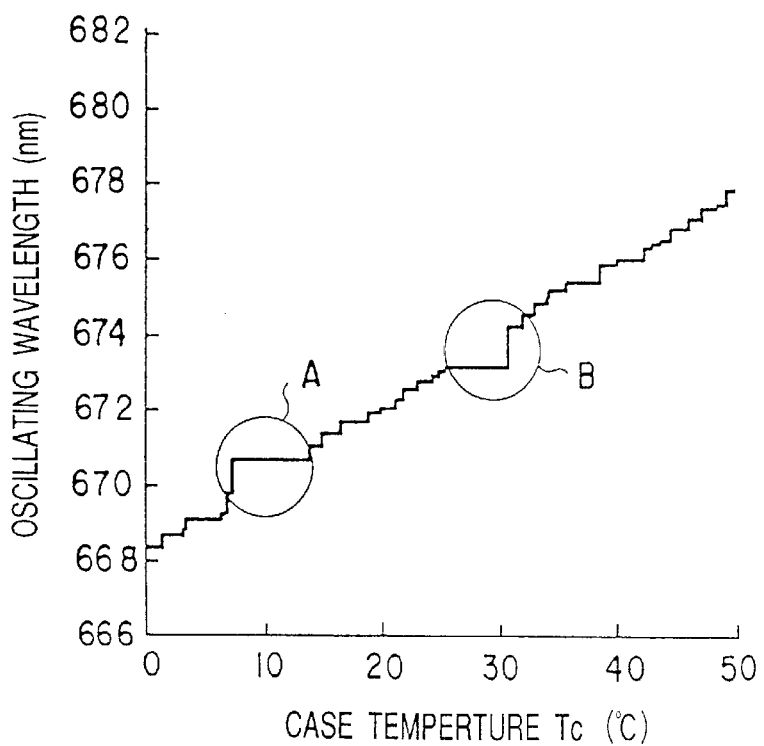
FIG. 6 is a graph showing a state in which a luminescent wavelength is changed when an environmental temperature is changed due to a mode hopping of the semiconductor laser element.
Figure 7:
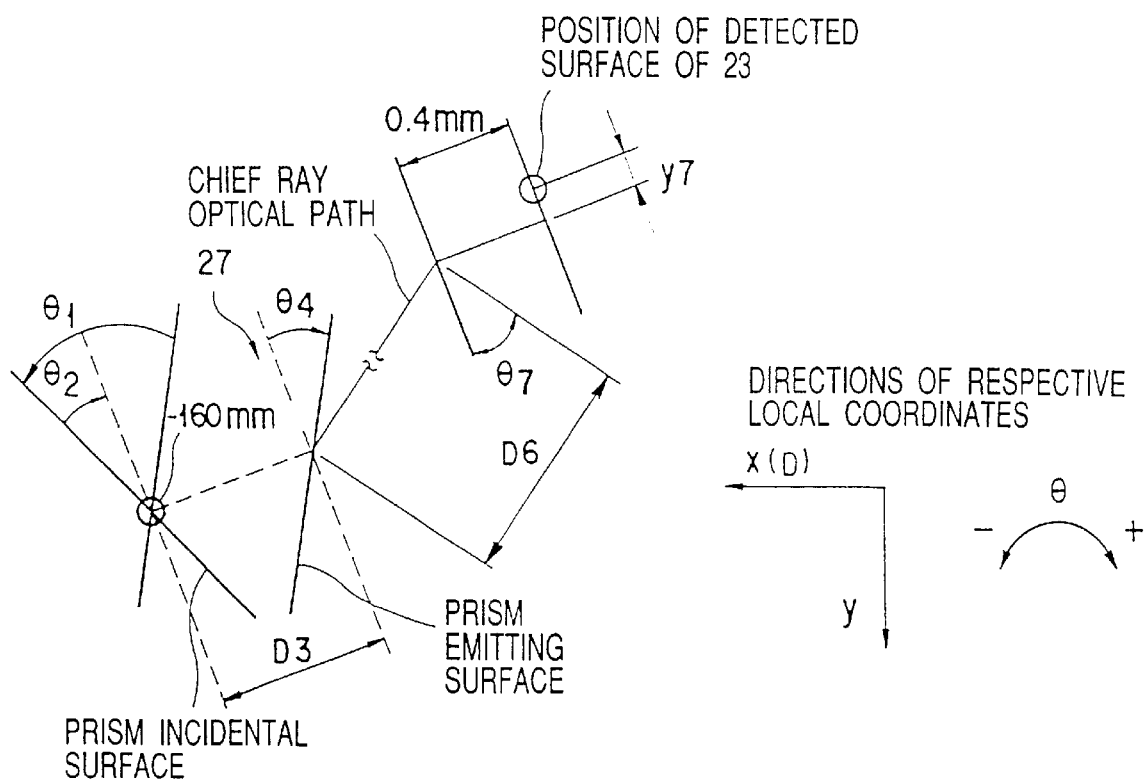
FIG. 7 is a schematic view explaining a positional relationship between parameters shown in Table 1, that is, θ1, θ2, D3, θ4, D6, θ7 and y7 in order to determine an angle α to be defined at a time of entering a laser beam into a prism shown in FIG. 5.

FIG. 6 is a graph showing a state in which the light emitting wavelength is changed when the environmental temperature is changed according to the mode hopping of the semiconductor laser element.

As shown in FIG. 6, it is recognized that the light emitting wavelength of the laser beam irradiated from a certain semiconductor laser element is about 2 nm lengthened (the oscillating frequency is reduced) as the environmental temperature (in this case, the temperature of the case surrounding the light emitting chip of the laser element) increases at 10° C.

However, as shown in A portion and B portion in FIG. 6, the change of the temperature and the wavelength are locally nonlinear, and as already explained, there is a case that the wavelength is 1 nm or more changed even when the temperature change is significantly small. In this case, the temperature at which the local wavelength change is generated is different at every laser element units, and it can not be defined at the current stage.

Figure 8:
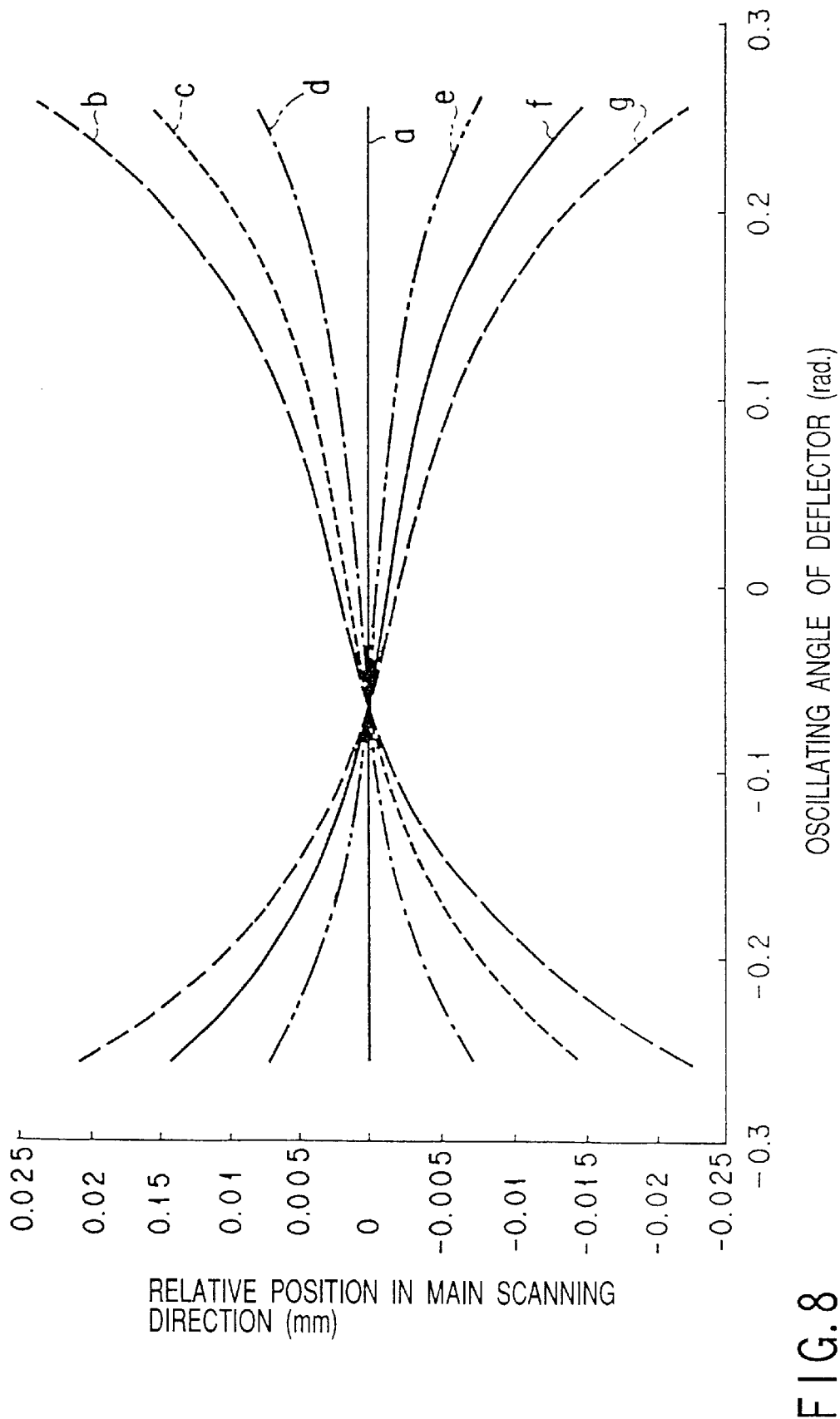
FIG. 8 is a graph showing a change of a position of a laser beam image formed on the image surface after passing through a two-assembled lens as a relative position in the main scanning direction in the case that the wavelength of the laser beam after emitting the laser component is changed in order to specify a characteristic of the prism shown in FIG. 5.

FIG. 8 is a graph showing a change of a position of a laser beam image formed on the image surface after passing through the respective lenses 21a and 21b of the two-assembled lens 21 as a relative position in the main scanning direction in the case that the wavelength of the laser beam after emitting the laser component is changed, in order to specify a characteristic of the prism (the optical path correcting element) 27 shown in FIG. 5.

As shown in FIG. 8, with reference to the laser beam having a wavelength of 680 nm (a curve a), it is recognized that the image forming positions of the laser beams having wavelength of 665 nm (a curve b), 670 nm (a curve c), 675 nm (a curve d), 685 nm (a curve e), 690 nm (a curve f) and 695 nm (a curve g) in the main scanning direction are about 0.045 mm changed at the maximum in connection with the change of the oscillating angles of the respective reflecting surfaces of the optical deflecting apparatus 7. In this case, as shown in FIG. 8, a polarity that the image forming position is changed becomes an opposite direction. Further, as shown in FIG. 6, the laser elements frequently generate the local wavelength change, and accordingly, the magnitude of the relative value shown in FIG. 8 actually includes the greater changing elements.

Figure 9:
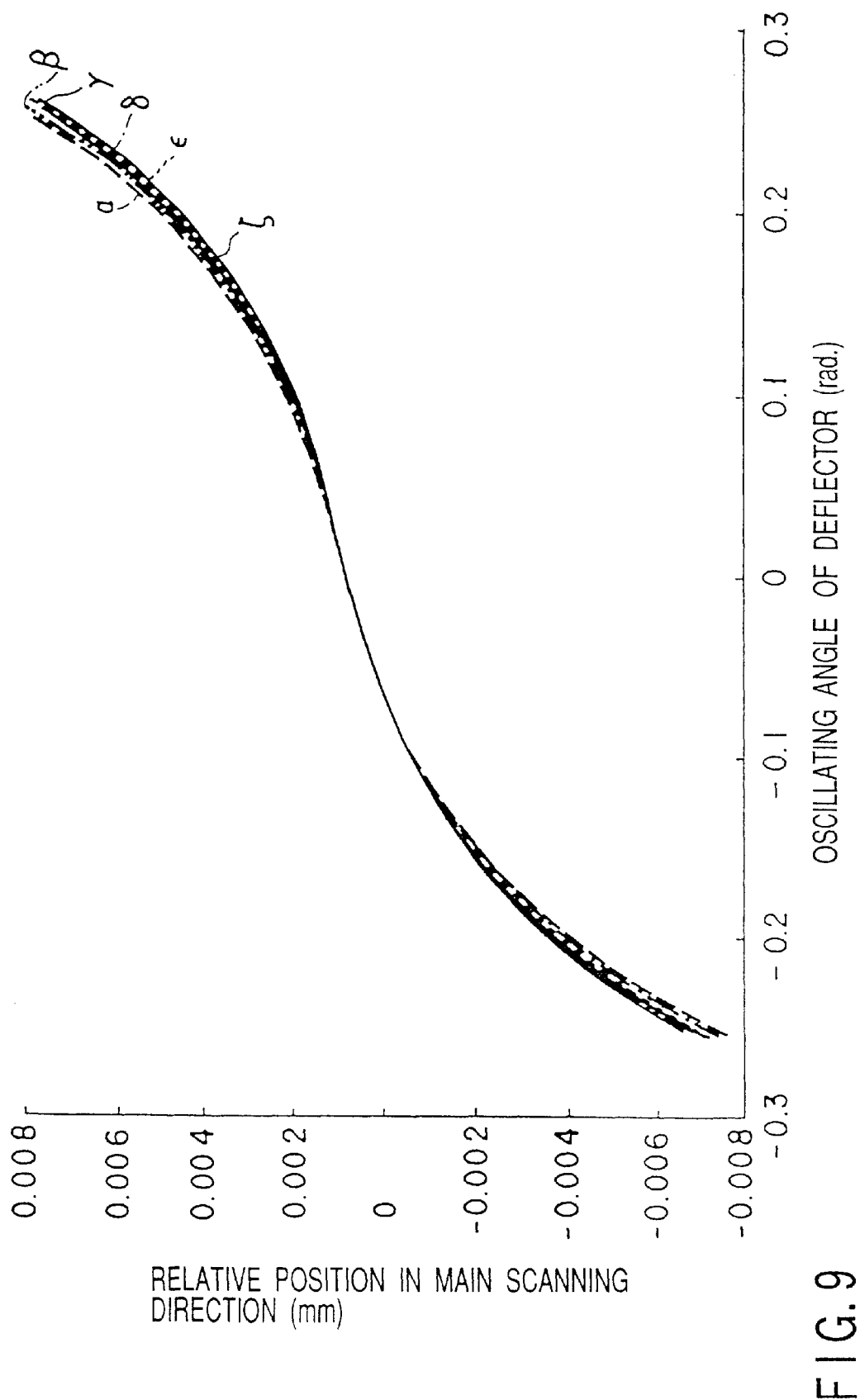
FIG. 9 a graph showing a change of the beam position image formed on the image surface as a relative position in the main scanning direction in the case that the wavelength of the laser beam from each of the laser components indicates the temperature-wavelength change shown in FIG. 8 in a state of taking out the prism from the multi-beam exposure apparatus shown in FIGS. 1 and 2.

FIG. 9 is a graph which shows a change of the beam position image formed on the image surface as a relative position in the main scanning direction in the case that the wavelength of the laser beam from each of the laser components indicates the temperature-wavelength change shown in FIG. 8 in a state of taking out the optical path correcting element 27 from the multi-beam exposure apparatus 1 corresponding to the embodiment according to the present invention shown in FIGS. 1 and 2. In this case, in FIG. 9, respective curves α to ζ respectively show differences at every conditions in which the wavelengths are 5 nm different, that is, a difference between the wavelengths of 665 and 670 (a curve α), a difference between the wavelengths of 670 and 675 (a curve β), a difference between the wavelengths of 675 and 680 (a curve γ), a difference between the wavelengths of 680 and 685 (a curve δ), a difference between the wavelengths of 685 and 690 (a curve ε), a difference between the wavelengths of 690 and 695 (a curve ζ). In this case, also in FIG. 9, in the case of generating the local wavelength change shown in FIG. 6, it is further greater changed.

Figure 10:
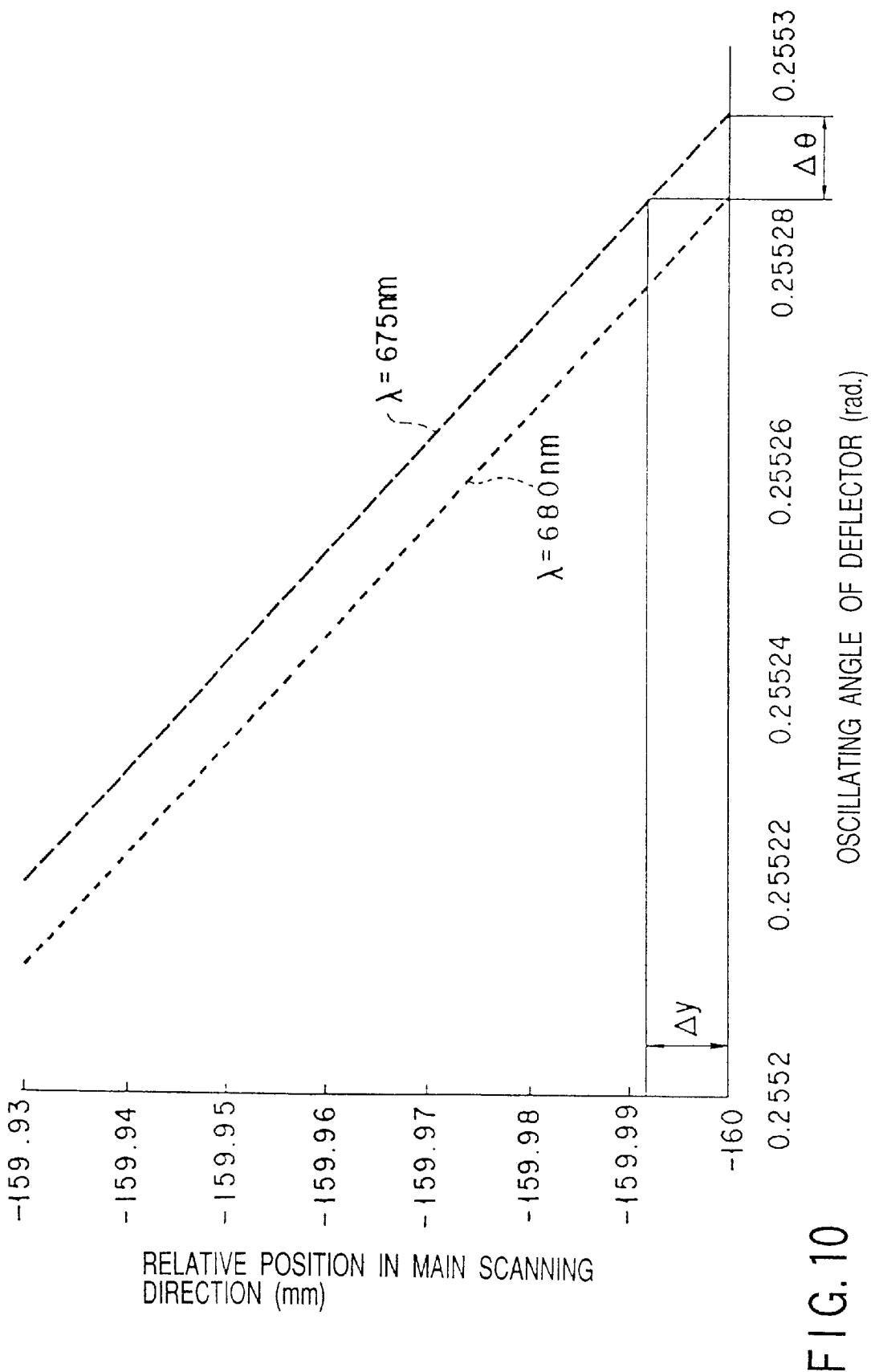
FIG. 10 is a graph showing an oscillation angle of a reflection angle of an optical deflection apparatus at a time of detecting a laser beam having a wavelength of 675 nm and an oscillation angle of the reflection angle of the optical deflection apparatus at a time of detecting a laser beam having a wavelength of 680 nm when setting a position for detecting the laser beam at the position in the main scanning direction to −160 mm, and showing that a difference of a rotational angle Δθ is generated at a degree Δθ=7.5 μrad.

In this case, as shown in FIG. 10, in the case of setting a direction that the respective reflecting surfaces of the optical deflecting apparatus 7 are rotated to a minus (−) direction from a plus (+) direction and setting the respective laser beams to be moved on the image surface from the minus (−) direction to the plus (+) direction, it is recognized that a rotational angle Δθ of each of the reflecting surfaces in the optical deflecting apparatus 7 is Δθ=7.5 μrad shifter between the timing of detecting the laser beam having the wavelength of 675 nm and the timing of detecting the laser beam having the wavelength of 680 nm when setting the position at which the light detector for detecting the horizontal synchronism 23 is provided to −160 mm corresponding to the position in the main scanning direction. This fact shows the same motion as that in the case that the position at which the light detector for detecting the horizontal synchronism 23 is provided is about 7.5 nm moved to the plus (+) side in the main scanning direction.

Further, an apparent difference of the detector for the horizontal synchronism 23 mentioned above just corresponds to writing the image in a state of being $\Delta\theta=7.5$ μrad shifted in all the image area, so that the relative positional shifting amount of the writing start position between two laser beams having different wavelengths becomes an affected component shifting at the rotational angle $\Delta\theta$ of the respective reflecting surfaces in the optical deflecting apparatus 7 generated for setting the writing timing reference to the main scanning position at the end portion having the different position according to the wavelength, with respect to the shifting amount 7.5 μm of the beam position expressed by 0.0675–0.0680 shown in FIG. 9, that is, the position in the main scanning direction y is expressed by the formula $y=y+\Delta y$, and the magnitude becomes a value obtained by adding $\Delta y=7.5$ μm.

Figure 11:
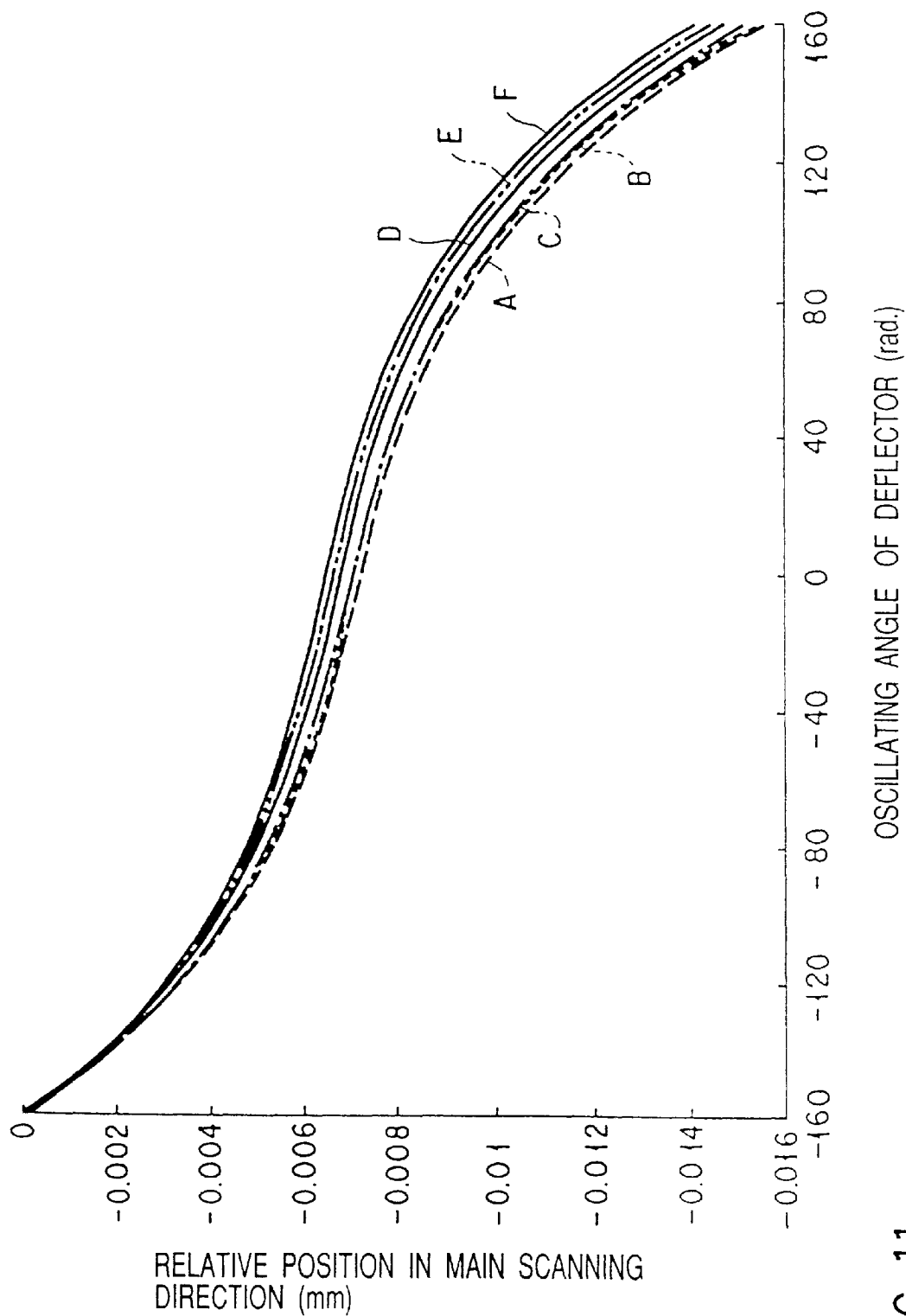
FIG. 11 is a graph showing a degree of difference in the position of the laser beam in the main scanning direction opposite to the writing position at a time of emitting the laser beam when a fixed time has passed after setting a position for detecting the laser beam in the main scanning direction position to −160 mm.

Accordingly, as shown in FIG. 11, the positions are substantially equal to each other near the position that the position in the main scanning direction y satisfies the formula y=−160, however, near the opposite side which satisfies the formula y=160, the total 15 μm difference is generated by adding the position shifting mount in the main scanning direction of the beam at the horizontal synchronous position $\Delta y=7.5$ μm to the shifting amount of the beam position 7.5 μm.

Again, with reference to FIG. 5, the prism 27 formed in an isosceles triangle corresponds to an optical component which can return the amount that the writing position is shifted to the main scanning direction according to the wavelength change of the laser beam due to the temperature shown in FIGS. 6 to 10 and can input to the position at which the laser beam having the wavelength of the reference on the detecting surface of the light detector for detecting the horizontal synchronism 23 provided at the predetermined position is input, and more particularly, when setting the top angle of the prism 27 to "A", a refractive index of the prism to "n", and an angle formed between the incidental laser beam and the emitting laser beam when the laser beam having a wavelength of λ is input at an incident angle α, that is, an angle of deflection to B, the following formulas are established.

$$\sin\alpha = n \sin (A/2) \tag{1}$$

And the formula (3) is introduced from the formula (2).

$$(B+A)/2=\alpha \tag{2}$$

$$n=\sin((B+A)/2)/\sin(A/2) \tag{3}$$

In accordance with the formulas (1) to (3), when setting the wavelength of the reference laser beam to λ and the wavelength of the laser beam changing in corresponding to the temperature change to $\lambda+\Delta\lambda$, in comparison with the time when the laser beam having the wavelength of λ is input to the prism 27 at the incident angle α, the changing amount $\Delta B$ of the angle of deflection B and the changing amount $\Delta\lambda$ of the wavelength when the laser beam having the wavelength of $\lambda+\Delta\lambda$ is input can be expressed by the following formula.

$$\Delta B/\Delta\lambda = \Delta B/\Delta n \times \Delta n/\Delta\lambda \tag{4}$$

$$= 2\sin(A/2)\big/(1-n^2\sin^2(A/2))^{(1/2)} \times \Delta n/\Delta\lambda$$

Further, when setting the distance between the prism 27 and the light detector for detecting the horizontal synchronism 23 to D, it is possible to cancel the change of the laser beam in the two-assembled lens in the case that the wavelength λ of the laser beam is changed to $\lambda+\Delta\lambda$ by setting the shape and the position of the prism 27 so as to satisfy the following formula.

$$\Delta y/\Delta\lambda = -D \times \Delta B/\Delta\lambda \tag{5}$$

$$= -D \times 2\sin(A/2)\big/(1-n^2\sin^2(A/2))^{(1/2)} \times \Delta n/\Delta\lambda$$

In this case, $\Delta y/\Delta\lambda$ in the formula (5) can be determined by calculating each of the position at which the laser beam having the wavelength of λ is input and the position at which the laser beam having the wavelength of $\lambda+\Delta\lambda$ is input on the detecting surface of the detector for detecting the horizontal synchronism 23 after taking out the prism (optical path correcting element) 27 of the multi-beam exposure apparatus 1 shown in FIGS. 1 and 2, on the basis of the characteristics of the respective lenses 21a and 21b of the two-assembled lens 21, and setting the results to y sns and y sns+$\Delta y$.

Accordingly, on the basis of the formula (5), it is sufficient to set D, A, n and $\Delta n$. In this case, since n and $\Delta n$ are defined by a material of the glass utilized for the prism 27, the range of D and A in which the prism 27 can be arranged can be set when the material of the glass is determined.

Here, in the case of previously determining D and calculating A, the following formula can be introduced by solving the formula (5) with respect to A.

$$A = 2\arcsin\big((\Delta y/\Delta\lambda)\big/(4D^2(\Delta n/\Delta\lambda)^2 + \tag{6}$$

$$n^2(\Delta y/\Delta\lambda)2)^{(1/2)}\big)$$

The incident angle and the emitting angle α in this case can be calculated by the following formula.

$$a=\arcsin (n \sin (A/2)) \tag{7}$$

More particularly, when taking out the prism 27 from the multi-beam exposure apparatus 1 shown in FIGS. 1 and 2, the laser beam input to the light detector for detecting the horizontal synchronism 23 is guided to the 7.5 μm shifting position as shown in FIG. 8 according to the change of the wavelength λ of 5 nm, so that the following formula can be obtained on the basis of the formula (5).

$$\Delta y/\Delta\lambda = 7.5 \times 10^{-\frac{3}{5}} \tag{8}$$

$$= 1.5 \times 10^{-3} (\text{mm}/\text{nm})$$

At this time, when setting the material of the prism 27 to BK7 (the optical glass), the refractive index n and the refractive index change/the wavelength change $\Delta n/\Delta\lambda$ can be expressed by n=1.513605 and $\Delta n/\Delta\lambda=-2.8486\times10^{-5}$ (1/nm).

Further, when setting the distance between the prism 27 and the light detector 23 for detecting the horizontal synchronism 23 to 123 mm, the following formula can be obtained by the formula (6) and D and A can be calculated.

$$A = 2\sin^{-2}\left((1.5 \times 10^{-3})/(4D2(-2.8486 \times 10^{-5})^2 + 1.513605^2(1.5 \times 10^{-3})^2)^{(1/2)}\right) \quad (9)$$

Hereinafter, there are shown in Table 1, a position of the prism 27 optimized on the basis of the result of pursuing the beam according to a computer simulation, a distance from the position of the laser beam in the sub scanning direction and the light detector for detecting the horizontal synchronism in the main scanning direction, a combination of the incident angle α with respect to the chief ray of the laser beam emitted from the second lens 21b of the two-assembled lens 21, the top angle A and the incident angle α calculated from the formulas (6) and (7), and characteristics when setting the material of the prism 27 to BK7. In this case, in Table 1, x1, y1 indicate relative coordinates of a crossing point between the incident surface of the laser beam toward the prism 27 and the chief ray of the laser beam emitted from the second lens 21b when setting a crossing point between the optical axis of the emitting surface of the second lens 21b of the two-assembled lens 21 and the lens surface to the origin. Further, the respective parameters shown in Table 1, that is, θ1, θ2, D3, θ4, θ5, D6, θ7, y7 (with respect to θ1, θ2, D3, θ4, D6, θ7, y7, the positional relations are respectively shown in FIG. 7) show that the chief ray of the laser beam is input to the position of −160 mm when the optical path correcting component, that is, the prism 27 is structured such as to set the position at which the rotational angle of the reflecting surface in the optical deflecting apparatus 7 is 0 to a center in the main scanning direction, and respectively indicate an angle formed with respect to the incident surface at the incident position, a corresponding (defined in FIG. 5) angle γ, a distance between the incident surface and the emitting surface, an angle γ with respect to the emitting surface (defined in FIG. 5), an angle corresponding to the angle a shown in FIG. 5, a distance at which the chief ray emitted from the prism 27 is input to the surface glass of the horizontal synchronism detector 23, an angle between the surface glass of the horizontal synchronism detector 23 and the chief ray inputting to the surface glass of the horizontal synchronism detector 23, and an amount at which the chief ray is moved in the main scanning direction by the surface glass of the horizontal synchronism detector 23 having a thickness of 0.4 mm. In this case, as shown in Table 2, A corresponds to the top angle defined by using FIG. 5, θ4 becomes substantially A/2 and θ5 becomes substantially a according to the formulas (6) and (7).

TABLE 1

Shape, position and chief-ray path of prism made of BK7

Results obtained by tracking rays

| x1 | y1 | θ1 | θ2 | D3 | θ4 |
|---|---|---|---|---|---|
| −10 | −79.0999 | −35.6863 | 7.524531 | −2.01905 | 7.524531 |
| −15 | −81.3526 | −36.0382 | 7.754328 | −2.08179 | 7.754328 |
| −20 | −83.6054 | −36.4122 | 7.998374 | −2.1486 | 7.998374 |
| −25 | −85.8581 | −36.8105 | 8.258014 | −2.21988 | 8.258014 |
| −30 | −88.1109 | −37.2354 | 8.534768 | −2.2961 | 8.534768 |
| −35 | −90.3636 | −37.6897 | 8.83034 | −2.3778 | 8.83034 |
| −40 | −92.6164 | −38.1765 | 9.146687 | −2.46559 | 9.146687 |
| −45 | −94.8691 | −38.6992 | 9.486015 | −2.56017 | 9.486015 |
| −50 | −97.1219 | −39.2621 | 9.850863 | −2.66237 | 9.850863 |
| −55 | −99.3746 | −39.8698 | 10.24413 | −2.77315 | 10.24413 |
| −60 | −101.627 | −40.5278 | 10.66917 | −2.89362 | 10.66917 |
| −65 | −103.88 | −41.2424 | 11.12986 | −3.02514 | 11.12986 |
| −70 | −106.133 | −42.0212 | 11.63071 | −3.1693 | 11.63071 |
| −75 | −108.386 | −42.8728 | 12.17698 | −3.32801 | 12.17698 |
| −80 | −110.638 | −43.8078 | 12.77485 | −3.50361 | 12.77485 |

Results obtained by tracking rays

| x1 | θ5 | D6 | θ7 | y7 |
|---|---|---|---|---|
| −10 | −11.4323 | −178.526 | 26.07101 | −0.11995 |
| −15 | −11.7842 | −173.003 | 26.41873 | −0.12158 |
| −20 | −12.1583 | −167.477 | 26.78739 | −0.1233 |
| −25 | −12.5565 | −161.949 | 27.17892 | −0.12512 |
| −30 | −12.9815 | −156.417 | 27.59562 | −0.12707 |
| −35 | −13.4357 | −150.882 | 28.04001 | −0.12915 |
| −40 | −13.9225 | −145.344 | 28.51474 | −0.13136 |
| −45 | −14.4453 | −139.802 | 29.02319 | −0.13374 |
| −50 | −15.0082 | −134.255 | 29.56901 | −0.1363 |
| −55 | −15.6159 | −128.704 | 30.15651 | −0.13905 |
| −60 | −16.2738 | −123.147 | 30.79058 | −0.14201 |
| −65 | −16.9885 | −117.583 | 31.47705 | −0.14523 |
| −70 | −17.7672 | −112.013 | 32.22249 | −0.14872 |
| −75 | −18.6189 | −106.434 | 33.03508 | −0.15253 |
| −80 | −19.5538 | −100.847 | 33.92406 | −0.1567 |

TABLE 2

A obtained by approximation (6) α obtained by equation (7)

| A | θ 4-Equivalent = A/2 | θ5-Equivalent = α |
|---|---|---|
| 16.45229708 | 8.222614854 | −12.5075071 |
| 16.95068417 | 8.475342084 | −12.8900459 |
| 17.47961375 | 8.739806875 | −13.2963967 |
| 18.04191689 | 9.020958446 | −13.7288182 |
| 18.64077876 | 9.320389378 | −14.1898615 |
| 19.27978903 | 9.639894517 | −14.6824135 |
| 19.96301084 | 9.981505418 | −15.2097571 |
| 20.68505114 | 10.34752557 | −15.775634 |
| 21.48115761 | 10.74057881 | −16.3843312 |
| 22.32732313 | 11.16366157 | −17.0407775 |
| 23.24041855 | 11.62020927 | −17.7506663 |
| 24.22834055 | 12.11417027 | −18.5205988 |
| 25.30021084 | 12.65010542 | −19.3582766 |
| 26.46657293 | 13.23328647 | −20.2727083 |
| 27.73967404 | 13.86983702 | −21.2745029 |

As explained above, it is possible to prevent the position at which the respective laser beams are projected on the image surface is shifted in the main scanning direction due to the variation of the light emitting wavelengths caused by the change of the temperature between the light sources 3Ya and 3Yb, 3Ma and 3Mb, 3Ca and 3Cb, and 3Ba and 3Bb by inserting the prism 27 formed in an isosceles triangle shown in FIG. 5 as the optical path correcting element for changing the direction of the laser beam into the portion between the detecting surface of the optical detector for detecting the horizontal synchronism 23 and the reflecting mirror for detecting the horizontal synchronism 25 in correspondence to the change of the wavelength due to the change of the temperature of the laser beam emitted from the second lens 21b of the two-assembled lens 21 under a predetermined condition.

In this case, since the prism 27 shown in FIG. 5 has a function of making an angle β times and a position 1/β times, in the case that β is not 1, that is, in the case that the focused beams are input, the image forming position is shifted. For example, when the laser beam having a beam diameter h is input at a converging angle u, they form the image at a position of l=h/u from the place having the diameter h in the case that the prism 27 does not exist, however, in the case that the prism 27 exist, since the beam diameter h satisfies the formula h=β×h and the converging angle u satisfies the formula u=u/β, the image forming position 1 is expressed by the following formula.

$$l'=(\beta \times h)/(u/\beta)=\beta^2 \times h/u=\beta^2 \times l \quad (10)$$

On the contrary, with respect to the sub scanning direction, since it is affected by unevenness of sensitivity on the detecting surface of the light detector for detecting the horizontal synchronism 23 or the change according to the shape of the edge portion when the position of the laser beam is changed due to the change of the wavelength, it is necessary to make the incident surface and the emitting surface parallel to each other.

Further, since the laser beams guided to the image area from the second lens of the two-assembled lens 21 form image at the positions substantially equal to each of the main scanning direction and the sub scanning direction in the case that the prism 27 does not exist, there is generated a difference expressed by the formula of $l-l'=(1-\beta^2)\times l$ at the image forming position in the main scanning direction and the sub scanning direction also on the detecting surface of the light detector for detecting the horizontal synchronism 23 positioned on the equivalent image surface in the case that β is not 1, so that a great astigmatism is formed.

Accordingly, the image forming state becomes unstable in the detecting portion such that a flare is easily generated, the beam diameter is easily changed, and the like, so that the detecting accuracy is deteriorated.

In order to prevent the phenomenon from generating, it is necessary to set β=1, and this is satisfied only in the case that the incident beam and the refracted beam become symmetrical with respect to the top angle of the prism.

Accordingly, it is possible to restrict the generation of the flare or the change of the laser beam diameter, to stabilize the image forming state on the detecting surface of the light detector 23 and to improve a detecting accuracy by setting the incident beam and the refracted beam to a symmetrical relation with respect to the top angle A of the prism 27 and setting the magnitude of the top angle A so that the respective laser beams in the main scanning direction and the sub scanning direction are converged in the same place.

In this case, the prism 27 is, as the top angle A thereof is schematically shown in FIG. 1, arranged toward a direction in which the distance between the reflecting position of the laser beam on the reflecting surface in the optical deflecting apparatus 7 and the second lens 21b becomes minimum when the laser beam in the direction of the image area, that is, deflected by the optical deflecting apparatus 7 is input to the second lens 21b. This corresponds to the matter that the laser beams passing through the first lens 21a and the second lens 21b of the two-assembled lens 21 are excessively refracted toward the center of the main scanning direction of the lenses 21a and 21b in the case that the wavelengths of the laser beams emitted from the respective laser elements become short.

As explained above, it is possible to guide the laser beam in which the wavelength is changed according to the change of the temperature to the same position on the detecting surface of the light detector for detecting the horizontal synchronism in the case that the reflecting surface of the optical deflecting apparatus 7 has the same rotational angle, by using the prism 27 on the optical path between the image forming lens 21 disposed between the optical deflecting apparatus 7 and the image surface, and the light detector 23 for detecting the horizontal synchronism 23, the prism being structured such as to change the emitting angle in correspondence to the change of the wavelength caused by the change of the temperature of the laser beam from the light source with respect to the main scanning direction and to shift the beam position at the same amount as the position shifting amount generated by the image forming lens due to the difference of the wavelength and in the direction opposite thereto.

Accordingly, it is possible to set the shifting of the printing position in the main scanning direction at the opposite side to the writing position in the main scanning direction generated by the shifting of the writing timing caused by the laser beam having a different wavelength from the reference wavelength to about half the shifting amount of the printing position in the main scanning direction which has been generated at the opposite side to the writing position in the main scanning direction.

Figure 12:
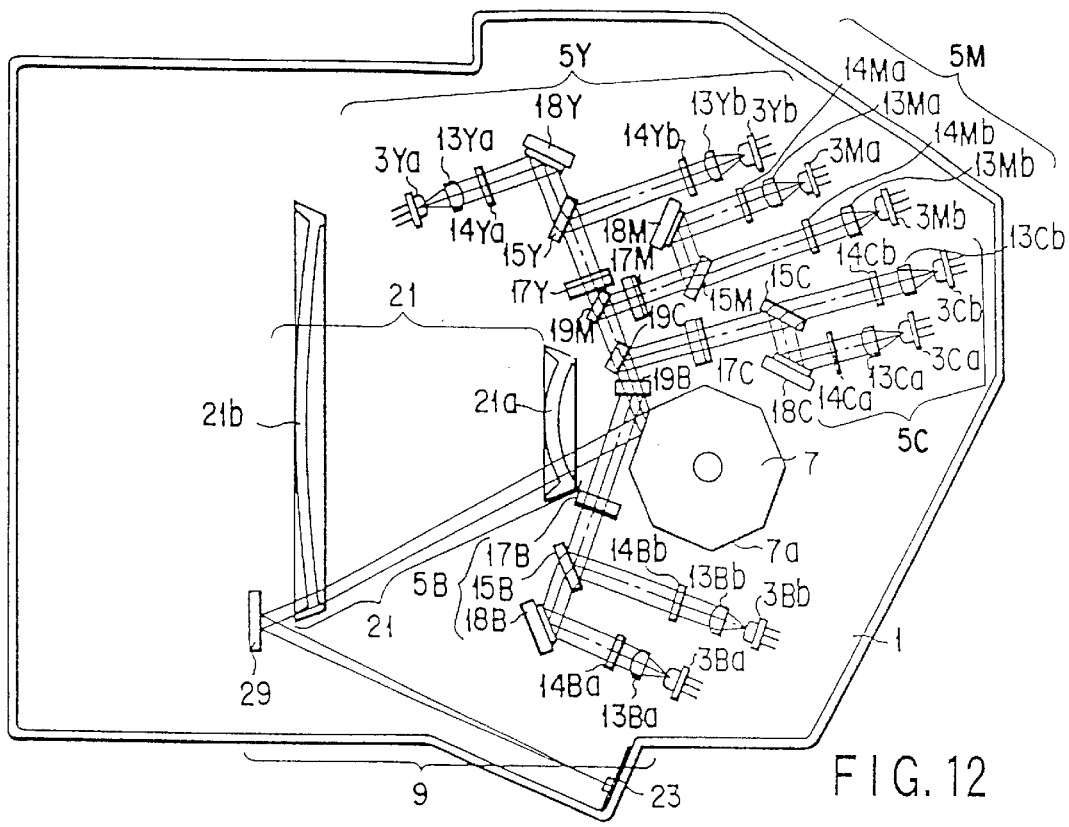
FIG. 12 is a plan schematic view showing another embodiment of the multi-beam exposure apparatus shown in FIGS. 1 and 2.
Figure 13:
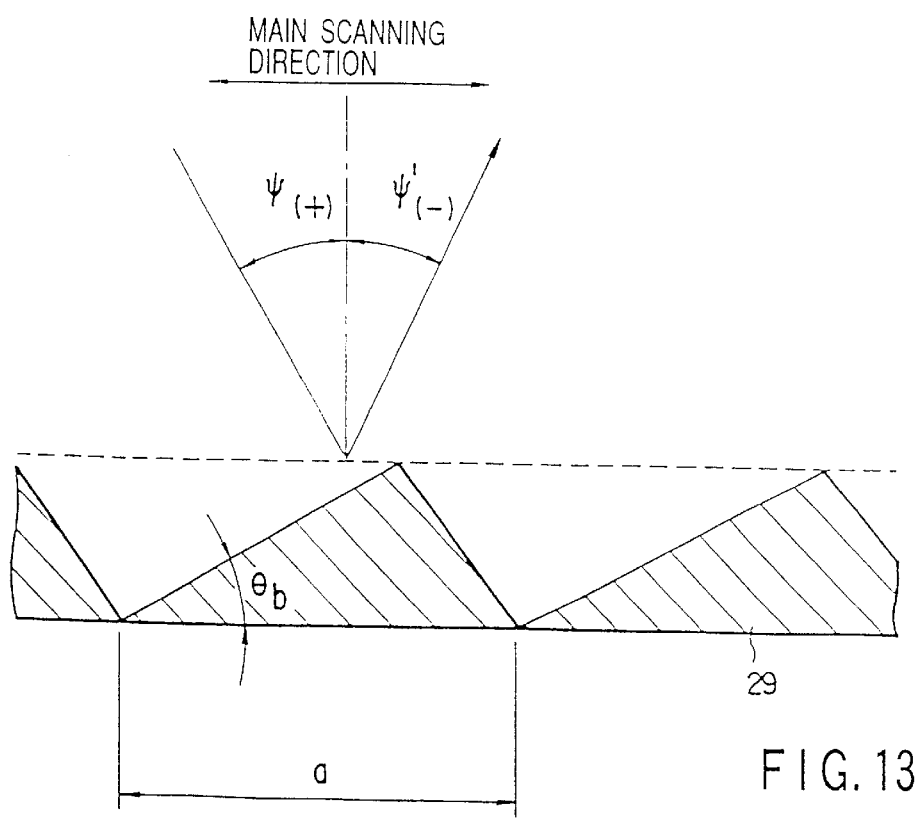
FIG. 13 is a schematic view showing an example of characteristics of diffraction gratings assembled in the multi-beam exposure apparatus shown in FIG. 12.

FIGS. 12 and 13 are schematic views which shows another embodiment of the multi-beam exposure apparatus shown in FIGS. 1 and 2. In this case, since the multi-beam exposure apparatus shown in FIGS. 12 and 13 corresponds to the structure obtained by replacing the mirror for detecting the horizontal synchronism 25 of the exposure apparatus shown in FIGS. 1 and 2 by a diffraction grating mentioned below and taking out the prism 27 shown in the exposure apparatus shown in FIGS. 1 and 2, the same reference numerals will be attached to the same elements and a detailed description will be omitted.

As shown in FIGS. 12 and 13, the diffraction grating (that is, the laser beam direction converting element) 29 is arranged on the optical path between the second lens 21b of the two-assembled image forming lens 21 in the post-deflection optical system 9 and the light detector for detecting the horizontal synchronism 23.

In this case, the diffraction grating 29 has an incline in the sub scanning direction so that all the laser beams emitted from the second lens 21b of the two-assembled lens 21 move toward the light detector for detecting the horizontal synchronism 23, and is structured such that the incident angle and the emitting angle have the opposite directions and the same formed angles in the case of viewing from a normal line with respect to the plane of all the grating, toward the main scanning direction. In this case, the grating of the diffraction grating 29 is structured such that grooves are formed in the direction parallel to the sub scanning direction at a predetermined pitch described below in the main scanning direction. Further, the diffraction grating 29 guides all the laser beams toward the light detector for detecting the horizontal synchronism 23 positioned on the equivalent image surface according to reflection.

As explained with reference to FIGS. 6 to 9, in the multi-beam exposure apparatus, in the case of not inserting the diffraction grating 29, since the position in the main scanning direction of the laser beam guided on the image surface is 7.5 μm shifted as the wavelength of the laser beam irradiated from the laser element corresponding to the light source is 5 nm increased, the formula $\Delta y/\Delta \lambda = 7.5 \times 10^{-3}/5 = 1.5 \times 10^{-3}$ (mm/nm) is established.

Further, since the reference wavelength of the laser beam is 680 nm, $\lambda=680\times 10^{-6}$, and as the kind of the diffraction grating 29, there is employed a saw-tooth-shaped echelette grating in which the grating is provided in parallel to the sub scanning direction and a cross sectional shape in the direction perpendicular to the direction of the grating is formed as shown in FIG. 13.

Hereinafter, a description will be given in detail of a characteristic of the grating of the diffraction grating 29.

In the diffraction grating, that is, the echelette grating 29, when setting a grating constant in the case that a parallel luminous flux is input to the diffraction grating 29 to a, an incident angle to Ψ and an angle of diffraction to Ψ', a diffraction efficiency becomes maximum when direction of the reflected beam on the respective groove surface and of the diffracted beam from the total of the grating surface are coincident with each other (when the relation Ψ+Ψ'=2θb is established). Further, when setting an angle (an angle of deflection) formed between the incident beam and the diffracted beam to (Ψ−Ψ'), the diffraction efficiency can be made maximum when the angle θb formed by the inclined surface and the flat portion of the grating 29 satisfies the following formula (11).

$$\theta b = \arcsin(\lambda/(2a)/\cos((\Psi-\Psi')/2)) \tag{11}$$

Here, the following formula is established.

$$m\lambda = (\sin\Psi + \sin\Psi')a$$

$$m = \pm 1, \pm 2 \tag{12}$$

Then, an angular dispersion $\Delta\Psi'/\Delta\lambda$ can be calculated by differentiating the formula (12) according to the following formula.

$$\Delta\psi'/\Delta\lambda = 1/a\left(\left(1-((m\lambda/a)-\sin\psi)^2\right)^{(1/2)}\right) \tag{13}$$

Hereinafter, it is possible to calculate $\Delta y/\Delta\lambda$ by taking out the diffraction grating 29 in the same manner as the case of using the prism 27, calculating each of the position in which the laser beam having a wavelength of λ is input and the position in which the laser beam having a wavelength of λ+Δλ is input, on the detecting surface of the light detector for detecting the horizontal synchronism 23 on the basis of the characteristics of the respective lenses 21a and 21b of the two-assembled lens 21 and setting the results to y sns and y sns+Δy.

Here, when setting a distance between the diffraction grating 29 and the light detector for detecting the horizontal synchronism 23 to D, it is possible to cancel the change of the laser beam position in the two-assembled lens in the case that the wavelength λ of the laser beam is changed to λ+Δλ by setting the shape and the inserting position of the diffraction grating 29 so that the following formula is satisfied.

$$\Delta y/\Delta\lambda = -D \times \Delta\psi'/\Delta\lambda \tag{14}$$

$$= -D \times 1/a\left(\left(1-((m\lambda/a)-\sin\psi)^2\right)^{(1/2)}\right)$$

In this case, Ψ can be calculated according to the following formula (15).

$$\psi = \arcsin\left((m\lambda/a) \pm (1-(D^2/(\Delta y/\Delta\lambda)^2 a^2))^{(1/2)}\right) \tag{15}$$

Then, on the basis of the formula (15), a, m, D and Ψ are set, Ψ'is calculated on the basis of the Ψ and the formula (12) and θb is calculated on the basis of the formula (11), respectively. In this case, Ψ'can be rewritten by the following formula.

$$\Psi' = \arcsin((m\lambda/a) - \sin\Psi) \tag{16}$$

There are shown in Table 3 below a distance between the diffraction grating 29 optimized on the basis of the result of pursuit of the beam according to the computer simulation and the light detector 23 for detecting the horizontal synchronism, an incident angle to the diffraction grating 29, an emitting angle from the diffraction grating 29 and a local angle θb of the incident surface of the diffraction grating 29.

TABLE 3

Properties of diffraction crating

| Order m of Diffraction | Grating constant a | Distance (mm) between grating and sensor | Angle of incidence (degree) | Diffraction angle (degree) | θb (degree) |
|---|---|---|---|---|---|
| 1 | 0.1 | 20 | 86.26335828 | −82.34017276 | 1.96159276 |
| 1 | 0.1 | 30 | 80.61070764 | −78.46535511 | 1.072676264 |
| 1 | 0.1 | 40 | 76.07182806 | −74.53618831 | 0.767819878 |
| 1 | 0.1 | 50 | 71.73564116 | −70.5308595 | 0.60239083 |
| 1 | 0.1 | 60 | 67.41763658 | −66.42378053 | 0.496928025 |
| 1 | 0.1 | 70 | 63.03049032 | −62.18369467 | 0.423397823 |
| 1 | 0.1 | 80 | 58.50885457 | −57.77075117 | 0.369051701 |
| 1 | 0.01 | 10 | 54.42673418 | −48.19110638 | 3.117813899 |
| 1 | 0.015 | 20 | 30.22981527 | −27.26684862 | 1.481483326 |
| 1 | 0.025 | 30 | 38.84499004 | −36.87098507 | 0.987002488 |
| 1 | 0.03 | 40 | 28.73782667 | −27.26684862 | 0.735489024 |
| 1 | 0.035 | 50 | 18.92610661 | −17.75331375 | 0.586396427 |
| 1 | 0.045 | 60 | 28.24525841 | −27.26684862 | 0.489204897 |
| 1 | 0.05 | 70 | 21.87737923 | −21.04009031 | 0.418644462 |
| 1 | 0.055 | 80 | 14.87326712 | −14.1415273 | 0.36586991 |

As explained above, also in the case of using the diffraction grating, it is possible to prevent the position at which the respective laser beams are projected on the image surface is shifted in the main scanning direction due to the variation of the light emitting wavelengths caused by the change of the temperature between the light sources 3Ya and 3Yb, 3Ma and 3Mb, 3Ca and 3Cb, and 3Ba and 3Bb.

That is, it is possible to guide the laser beam in which the wavelength is changed according to the change of the temperature to the same position on the detecting surface of the light detector for detecting the horizontal synchronism in the case that the reflecting surface of the optical deflecting apparatus 7 has the same rotational angle, by using the diffraction grating 29 on the optical path between the image forming lens 21 disposed between the optical deflecting apparatus 7 and the image surface, and the light detector 23 for detecting the horizontal synchronism 23, the prism being structured such as to change the emitting angle in correspondence to the change of the wavelength caused by the change of the temperature of the laser beam from the light source with respect to the main scanning direction and to shift the beam position at the same amount as the position shifting amount generated by the image forming lens due to the difference of the wavelength and in the direction opposite thereto.

Accordingly, it is possible to set the shifting of the printing position in the main scanning direction at the opposite side to the writing position in the main scanning direction generated by the shifting of the writing timing caused by the laser beam having a different wavelength from the reference wavelength to about half the shifting amount of the printing position in the main scanning direction which has been generated at the opposite side to the writing position in the main scanning direction.

As explained above, in the multi-beam exposure apparatus according to the present invention, it is possible to guide the laser beam in which the wavelength is changed according to the change of the temperature to the same position on the detecting surface of the light detector for detecting the horizontal synchronism in the case that the reflecting surface of the optical deflecting apparatus 7 has the same rotational angle, by using the prism 27 on the optical path between the image forming lens 21 disposed between the optical deflecting apparatus 7 and the image surface, and the light detector 23 for detecting the horizontal synchronism 23, the prism being structured such as to change the emitting angle in correspondence to the change of the wavelength caused by the change of the temperature of the laser beam from the light source with respect to the main scanning direction and to shift the beam position at the same amount as the position shifting amount generated by the image forming lens due to the difference of the wavelength and in the direction opposite thereto.

Further, according to the multi-beam exposure apparatus of the present invention, it is possible to guide the laser beam in which the wavelength is changed according to the change of the temperature to the same position on the detecting surface of the light detector for detecting the horizontal synchronism in the case that the reflecting surface of the optical deflecting apparatus 7 has the same rotational angle, by using the diffraction grating 29 on the optical path between the image forming lens 21 disposed between the optical deflecting apparatus 7 and the image surface, and the light detector 23 for detecting the horizontal synchronism 23, the prism being structured such as to change the emitting angle in correspondence to the change of the wavelength caused by the change of the temperature of the laser beam from the light source with respect to the main scanning direction and to shift the beam position at the same amount as the position shifting amount generated by the image forming lens due to the difference of the wavelength and in the direction opposite thereto.

Accordingly, it is possible to reduce the shifting of the printing position in the main scanning direction of the laser beam at the opposite side to the writing position to about half.

Accordingly, it is possible to provide a color image forming apparatus which can provide a color image with no color shifting, and a high speed image forming apparatus with no fading and no spread of a profile.

What is claimed is:

1. A multi-beam exposure apparatus comprising:
    a plurality of light sources for irradiating light beams having predetermined wavelengths;
    pre-deflection optical means for applying a predetermined optical characteristic to said light beam irradiated from each of said light sources;
    deflection means for deflecting said light beam passing through said pre-deflection optical means to a first direction corresponding to a direction in which a rotatably formed reflection surface is rotated at a predetermined speed;
    image formation optical means for continuously image forming said light beams deflected in said first direction by said deflection means on an image surface;
    detecting means for detecting at least one of said light beams passing through said image formation optical means and outputting predetermined signals corresponding to the light beams; and
    an optical element arranged between said deflection means and said detecting means and changing an emission angle in correspondence to a change of a wavelength of the light irradiated from each of the plurality of light sources.

2. A multi-beam exposure apparatus according to claim 1, wherein said optical element includes a prism having an angle formed by the incidental surface and the emitting surface which is greater than 0 degrees in a cross section viewed from a second direction perpendicular to said first direction.

3. A multi-beam exposure apparatus according to claim 2, wherein said incidental surface and said emitting surface of said prism are structured such that an angle between the incidental surface of said prism and said light beam in said first direction when said light beam is incident to said prism is equal to an angle formed between a light beam emitted from said prism in said first direction when said light beam is emitted from said prism and the emitting surface of said prism.

4. A multi-beam exposure apparatus according to claim 2, wherein a cross section of said prism viewed from said second direction is an isosceles triangle in which an angle between said incidental surface and said emitting surface is set to a top angle and lengths from the top angle are set to be equal to each other.

5. A multi-beam exposure apparatus according to claim 4, wherein said top angle of said prism is directed to a direction in which a distance between the reflecting point on said reflecting surface of said deflecting means and said image forming means becomes minimum when said light beam is incident to said image forming means.

6. A multi-beam exposure apparatus according to claim 1, wherein said optical element is a diffraction grating in which gratings are arranged in said first direction at a predetermined interval.

7. A multi-beam exposure apparatus according to claim 1, wherein said optical element is a diffraction grating in which a groove is formed in a direction perpendicular to said first direction.

8. A multi-beam exposure apparatus according to claim 1, wherein said detecting means is defined at a distance optically equivalent to said image surface and is arranged in an area except the image area among said image surface in which at least one of said light beams passing through said image forming means reaches.

9. A multi-beam exposure apparatus according to claim 1, wherein said optical element changes an emitting angle in accordance that wavelengths of the light beams irradiated from said respective light sources change in response to a change of a temperature.

10. A multi-beam exposure apparatus comprising:

a plurality of light sources;

a first optical element for assembling light beams irradiated from said plurality of light sources to one light beam so as to give a predetermined characteristic;

deflection means for deflecting said light beams supplied from said first optical element to a first direction corresponding to a direction in which a rotatably formed reflection surface is rotated at a predetermined speed;

a second optical element extended out along said first direction and image forming said light beams deflected from said deflection means to a predetermined position so as to satisfy a function corresponding to a rotation of said reflection surface in said deflection means;

detecting means arranged at a distance optically equivalent to a position at which said light beams passing through said second optical element reaches and in an area except an image area in which said light beam passing through said second optical element functions as an image and detecting at least one of said light beams passing through said second optical element so as to output a predetermined signal; and an optical element arranged between said second optical element and said detecting means, changing an emission angle in correspondence to a change of a wavelength of the light irradiated from said plurality of light sources due to a change of a temperature with respect to said first direction and shifting a position to which the light reaches to a direction having the same amount as a position shifting amount on a predetermined image surface generated by said second optical element due to a difference of the wavelength and having an opposite direction, thereby guiding the light having a wavelength which is changed due to a change of the temperature to the same position on the detecting surface of said detecting means in the case that the reflection surface of said deflection means has the same rotational angle.

11. A multi-beam exposure apparatus comprising:

a plurality of light sources for irradiating lights having a predetermined wavelength at a predetermined temperature;

pre-deflection optical means for assembling lights irradiated from said light sources to one light beam so as to give a predetermined characteristic;

deflection means for deflecting a group of lights emitted from said pre-deflection optical means to a first direction;

an image formation lens extended out in said first direction and image forming the lights deflected by said deflection means on a predetermined image surface at a uniform speed;

detecting means defined at a distance optically equivalent to said predetermined image surface, arranged at a position in which the lights passing through said lens reaches and in an area except an image area among said predetermined image surface and detecting the lights passing through said lens so as to output a predetermined signal; and an optical element arranged on an optical path between said lens and said detecting means, to change an emission angle in correspondence to a change of a wavelength of the light irradiated from said plurality of light sources due to a change of a temperature, wherein the change in emission angle causes a shift in a position at which the light reaches an image surface of the detecting means, the shift being in an opposite direction and by an amount which is essentially the same as a position shift amount induced in the first direction by said image forming lens due to the change in wavelength.

12. A multi-beam exposure apparatus comprising:

a plurality of light sources for irradiating light beams having predetermined wavelengths;

an optical pre-deflector to apply a predetermined optical characteristic to said light beam irradiated from each of said light sources;

a deflector to deflect said light beam passing through said optical pre-deflector to a first direction corresponding to a direction in which a rotatably formed reflection surface is rotated at a predetermined speed;

an optical image former to continuously image form said light beams deflected in said first direction by said deflector on an image surface;

a detector to detect at least one of said light beams passing through said optical image former and output predetermined signals corresponding to the light beams; and an optical element arranged between said deflector and said detector to change an emission angle in correspondence to a change of a wavelength of light irradiated from each of the plurality of light sources.

13. A multi-beam exposure apparatus comprising:

a plurality of light sources;

a first optical element to assemble light beams irradiated from said plurality of light sources to one light beam so as to give a predetermined characteristic;

a deflector to deflect said light beams supplied from said first optical element to a first direction corresponding to a direction in which a rotatably formed reflection surface is rotated at a predetermined speed;

a second optical element extended out along said first direction to image form said light beams deflected from said deflector to a predetermined position so as to satisfy a function corresponding to a rotation of said reflection surface in said deflector;

a detector arranged at a distance optically equivalent to a position at which said light beams passing through said second optical element reaches and in an area except an image area in which said light beam passing through said second optical element functions as an image to detect at least one of said light beams passing through said second optical element so as to output a predetermined signal; and an optical element arranged between said second optical element and said detector to change an emission angle in correspondence to a change of a wavelength of the light irradiated from said plurality of light sources due to a change of a temperature with respect to said first direction and shifting a position to which the light reaches to a direction having the same amount as a position shifting amount on a predetermined image surface generated by said second optical element due to a difference of the wavelength and having an opposite direction, thereby guiding the light having a wavelength which is changed due to a change of the temperature to the same position on the detecting surface of said detector in the case that the reflection surface of said deflector has the same rotational angle.

14. A multi-beam exposure apparatus comprising:

a plurality of light sources for irradiating lights having a predetermined wavelength at a predetermined temperature;

an optical pre-deflector to assemble lights irradiated from said light sources to one light beam so as to give a predetermined characteristic;

a deflector to deflect a group of lights emitted from said optical pre-deflector to a first direction;

an image formation lens extended out in said first direction to image form the lights deflected by said deflector on a predetermined image surface at a uniform speed;

a detector defined at a distance optically equivalent to said predetermined image surface, arranged at a position in which the lights passing through said lens reaches and in an area except an image area among said predetermined image surface to detect the lights passing through said lens so as to output a predetermined signal; and an optical element arranged on an optical path between said lens and said detector, to change an emission angle in correspondence to a change of a wavelength of the light irradiated from said plurality of light sources due to a change of a temperature, wherein the change in the emission angle causes a shift in a position at which the light reaches an image surface of the detector, the shift being in an opposite direction and by an amount which is essentially the same as a position shift amount induced in the first direction by said image formation lens due to the change in wavelength.

15. A multi-beam exposure apparatus comprising:

a plurality of light sources which each irradiate light beams having predetermined wavelengths;

pre-deflection optical members which apply a predetermined optical characteristic to said light beam irradiated from each of said light sources;

a deflection unit which deflects said light beam passing through said pre-deflection optical members to a first direction corresponding to a direction in which a rotatably formed reflection surface is rotated at a predetermined speed;

an image forming optical means which forms an image beam deflected in said first direction by said deflection unit on an image surface;

a detecting device detecting at least one of said light beams passing through said image forming optical member, said detecting device being configured to output predetermined signals corresponding to the light beams; and an optical element which is arranged between said deflection unit and said detecting device, and which changes an emission angle in correspondence to a change of a wavelength of the light irradiated from each of the plurality of light sources.

16. A multi-beam exposure apparatus according to claim 15, wherein said optical element includes a prism having an angle formed by the incidental surface and the emitting surface which is greater than 0 degrees in cross section as viewed from a second direction perpendicular to said first direction.

17. A multi-beam exposure apparatus according to claim 16, wherein said incidental surface and said emitting surface of said prism are structured such that an angle between the incidental surface of said prism and said light beam in said first direction, when said light beam is incident to said prism, is equal to an angle formed between a light beam emitted from said prism in said first direction when said light beam is emitted from said prism and the emitting surface of said prism.

18. A multi-beam exposure apparatus according to claim 16, wherein a cross section of said prism viewed from said second direction is an isosceles triangle in which an angle between said incidental surface and said emitting surface is set to a top angle and wherein lengths from the top angle are set to be equal to each other.

19. A multi-beam exposure apparatus according to claim 18, wherein said top angle of said prism is directed in a direction in which a distance between the reflecting point on said reflecting surface of said deflection unit and said image forming optical means is minimized when said light beam is incident to said image forming optical member.

20. A multi-beam exposure apparatus according to claim 15, wherein said optical element is a diffraction grating in which gratings are arranged in said first direction at predetermined intervals.

21. A multi-beam exposure apparatus according to claim 15, wherein said optical element is a diffraction grating in which a groove is formed in a direction perpendicular to said first direction.

22. A multi-beam exposure apparatus according to claim 15, wherein said detecting device is defined at a distance optically equivalent to said image surface and is arranged in an area other than the image area on said image surface which at least one of said light beams, passing through said image forming optical member, is allowed to reach.

23. A multi-beam exposure apparatus according to claim 15, wherein said optical element changes an emitting angle in accordance with wavelengths of the light beams irradiated from said respective light sources that change in response to a change of a temperature.

24. A multi-beam exposure apparatus comprising:

a plurality of light sources;

a first optical element which substantially synthesizes light beams irradiated from said plurality of light sources into one light beam having a predetermined characteristic;

a deflection unit which deflects said light beams supplied from said first optical element in a first direction corresponding to a direction in which a rotatably formed reflection surface is rotated at a predetermined speed;

a second optical element which extends out along said first direction forms an image with said light beams deflected from said deflection unit in a predetermined position so as to satisfy a function corresponding to a rotation of said reflection surface in said deflection unit;

a detecting device arranged at a distance optically equivalent to a position which said light beams passing through said second optical element are allowed to reach and in an area other than an image area in which said light beam passing through said second optical element functions as an image, said detecting device detects at least one of said light beams passing through said second optical element so as to output a predetermined signal; and an optical element arranged between said second optical element and said detecting device which changes an emission angle in correspondence to a change of a wavelength of the light irradiated from said plurality of light sources due to a change of a temperature with respect to said first direction, wherein said optical element shifts a position which the light is allowed to reach in a direction by an amount which is a the same as a position shifting amount on a predetermined image surface generated by said second optical element due to a difference of the wavelength and having an opposite direction, and guides the light having a wavelength which is changed due to a change of the temperature to the same position on the detecting surface of said detecting device, in the case that the reflection surface of said deflection unit has the same rotational angle.

25. A multi-beam exposure apparatus comprising:

a plurality of light sources which each irradiates lights having a predetermined temperature;

pre-deflection optical members which substantially synthesize lights irradiated from said light sources into one light beam so as to impart a predetermined characteristic;

a deflection unit which deflects a group of lights emitted from said pre-deflection optical members to a first direction;

an image forming lens extended out in said first direction which forms the lights deflected by said deflection unit on a predetermined image surface at a uniform speed;

a detecting device defined at a distance optically equivalent to said predetermined image surface, arranged at a position which the lights passing through said lens are allowed to reach and in an area other than an image are among said predetermined image surface and detecting the lights passing through said lens so as to output a predetermined signal; and an optical element arranged on an optical path between said lens and said detecting device, which changes an emission angle in correspondence to a change of a wavelength of the light irradiated from said plurality of light sources due to a change of a temperature with respect to said first direction and shifts a position which the light is allowed to reach in a direction which amount is the same as a position shifting amount generated by said lens due to a difference of the wavelength and having an opposite direction, and reduces a difference of the image of a main scanning direction position at a position to a writing position in said first direction generated by a difference of the writing timing caused by the light being different from a reference wavelength in the wavelength.

26. A multi-beam exposure apparatus comprising:

a plurality of light sources which each irradiate light beams having predetermined wavelengths;

an optical pre-deflector which gives a predetermined optical characteristic to said light beam irradiated from each of said light sources;

a deflector which deflects said light beam passing through said optical pre-deflector to a first direction corresponding to a direction in which a rotatably formed reflection surface is rotated at a predetermined speed;

an optical image forming element which continuously forms an image with said light beams deflected in said first direction by said deflector on an image surface;

a detector which detects at least one of said light beams passing through said optical image forming element and outputs predetermined signals corresponding to the light beams; and an optical element arranged between said deflector and said detector to change an emission angle in correspondence to a change of a wavelength of light irradiated from each of the plurality of light sources.

27. A multi-beam exposure apparatus comprising:

a plurality of light sources;

a first optical element which substantially synthesizes light beams irradiated from said plurality of light sources into one light beam so as to impart a predetermined characteristic;

a deflector which deflects said light beams supplied from said first optical element to a first direction corresponding to a direction in which a rotatably formed reflection surface is rotated at a predetermined speed;

a second optical element extended out along said first direction to form an image with said light beams deflected from said deflector to a predetermined position so as to satisfy a function corresponding to a rotation of said reflection surface in said deflector;

a detector arranged at a distance optically equivalent to a position which said light beams passing through said second optical element is allowed to reach and in an area other than an image area in which said light beam passing through said second optical element functions as an image to detect at least one of said light beams passing through said second optical element so as to output a predetermined signal; and an optical element which is arranged between said second optical element and said detector to change an emission angle in correspondence to a change of a wavelength of the light irradiated from said plurality of light sources due to a change of a temperature with respect to said first direction and shifts a position which the light is allowed to reach in a direction which is the same amount as a position shifting amount on a predetermined image surface generated by said second optical element due to a difference of the wavelength and having an opposite direction, and guides the light having a wavelength which is changed due to a change of the temperature to the same position on the detecting surface of said detector in the case that the reflection surface of said deflector has the same rotational angle.

28. A multi-beam exposure apparatus comprising:

a plurality of light sources which each irradiates lights having a predetermined wavelength at a predetermined temperature;

an optical pre-deflector which substantially synthesizes lights irradiated from said light sources into one light beam so as to impart a predetermined characteristic;

a deflector which deflects a group of light emitted from said optical pre-deflector to a first direction;

an image forming lens extended out in said first direction to form an image with the lights deflected by said deflector on a predetermined image surface at a uniform speed;

a detector defined at a distance optically equivalent to said predetermined image surface, arranged at a position which the lights passing through said lens are allowed to reach and in an area other than an image area among said predetermined image surface to detect the lights passing through lens so as to output a predetermined signal; and an optical element arranged on an optical path between said lens and said detector, to change an emission angle in correspondence to a change of a wavelength of the light irradiated from said plurality of light sources due to a change of a temperature with respect to said first direction and shifting a position which the light is allowed to reach in a direction by an amount which is the same as a position shifting amount generated by said lens due to a difference of the wavelength and having an opposite direction, thereby reducing a difference of the image of a main scanning direction position at a position opposite to a writing position in said first direction generated by a difference of the writing timing caused by the light being different generated by a difference of the writing timing caused by the light being different from a reference wavelength in the wavelength.

29. A beam exposure apparatus comprising:
a light source which irradiates a light beam having a predetermined wavelength;
a pre-deflection optical member which gives a predetermined optical characteristic to said light beam irradiated from said light source;
a deflection unit which deflects said light beam passing through said pre-deflection optical member to a first direction corresponding to a direction in which a rotatably formed reflection surface is rotated at a predetermined speed;
image forming optical element which forms an image beam deflected in said first direction by said deflection unit on an image surface;
a detecting device which detects said light beam passing through said image forming optical element, said detecting device being configured to output predetermined signals corresponding to the light beam; and
an optical element arranged between said deflection unit and said detecting device, wherein said optical element changes an emission angle in correspondence to a change of the wavelength of the light irradiated from light source.

30. A beam exposure apparatus according to claim 29, wherein said optical element includes a prism having an angle formed by the incidental surface and the emitting surface which is greater than 0 degrees in a cross section viewed from a second direction perpendicular to said first direction.

31. A beam exposure apparatus according to claim 30, wherein said incidental surface and said emitting surface of said prism are structured such that an angle between the incidental surface of said prism and said light beam in said first direction when said light beam is incident to said prism is equal to an angle formed between a light beam emitted from said prism is equal to an angle formed between a light beam emitted from said prism in said first direction when said light beam is emitted from said prism and the emitting surface of said prism.

32. A beam exposure apparatus according to claim 30, wherein a cross section of said prism viewed from said second direction is an isosceles triangle in which an angle between said incidental surface and said emitting surface is set to a top angle and lengths from the top angle are set to be equal to each other.

33. A beam exposure apparatus according to claim 32, wherein said top angle of said prism is directed to a direction in which a distance between the reflecting point on said reflecting surface of said deflection unit and said image forming optical element becomes minimum when said light beam is incident to said image forming optical member.

34. A beam exposure apparatus according to claim 29, wherein said optical element is a diffraction grating in which gratings are arranged in said first direction at predetermined intervals.

35. A beam exposure apparatus according to claim 29, wherein said optical element is a diffraction grating in which a groove is formed in a direction perpendicular to said first direction.

36. A beam exposure apparatus according to claim 29, wherein said detecting device is defined at a distance optically equivalent to said image surface and is arranged in an area other than the image area among said image surface which at least one of said light beam passing through said image forming optical element is allowed to reach.

37. A beam exposure apparatus according to claim 29, wherein said optical element changes an emitting angle in accordance with variation of wavelengths of the light beam irradiated from said respective light source which occurs in response to a change of a temperature.

38. An exposure apparatus comprising:
a light source;
a deflection unit which deflects said light beam supplied from said light source to a first direction corresponding to a direction in which a rotatably formed reflection surface is rotated at a predetermined speed;
an image forming optical element extended out along said first direction, wherein said optical element makes an image with said light beam deflected from said deflection unit in a predetermined position so as to satisfy a function corresponding to a rotation of said reflection surface in said deflection unit;
a detecting device arranged at a distance optically equivalent to a position which said light beam passing through said optical element is allowed to reach and in an area other than an image area in which said light beam passing through said optical element functions as an image, said detecting device detects said light beam passing through said optical element so as to output a predetermined signal; and
an optical means arranged between said optical element and said detecting device which changes an emission angle in correspondence to a change of a wavelength of the light irradiated from said light source due to a change of a temperature with respect to said first direction, wherein said image forming optical means shifts a position which the light is allowed to reach in a direction by an amount which is the same as a position shifting amount on a predetermined image surface generated by said optical element due to a difference of the wavelength and having an opposite direction, and configured to guide the light having a wavelength which is changed due to a change of the temperature to the same position on the detecting surface of said detecting device in the case that the reflection surface of said deflection unit has the same rotational angle.

39. An exposure apparatus comprising:
a light source which irradiates light having a predetermined wavelength at a predetermined temperature;
a deflection unit which deflects light emitted from said light source to a first direction;
an image forming lens extended out in said first direction and forming an image with the light deflected by said deflection unit on a predetermined image surface at a uniform speed;
a detecting device which is defined at a distance optically equivalent to said predetermined image surface, arranged at a position at which the light passing through said lens is allowed to reach and in an area other than an image area among said predetermined image surface and which detects the light passing through said image forming lens so as to output a predetermined signal; and
an optical element arranged on an optical path between said image forming lens and said detecting device, which changes an emission angle in correspondence to a change of a wavelength of the light irradiated from said light source due to a change of a temperature with respect to said first direction, shifts a position which the light is allowed to reach in a direction by an amount which is the same as a position shift amount generated by said lens due to a difference of the wavelength and having an opposite direction, and reduces a difference of the image of a main scanning direction position at a position opposite to a writing position in said first direction generated by a difference of the writing timing caused by the light being different from a reference wavelength in the wavelength.

40. An exposure apparatus comprising:

a light source which irradiates a light beam having predetermined wavelengths;

a deflector which deflects said light beam irradiated from said light source to a first direction corresponding to a direction in which a rotatably formed reflection surface is rotated at a predetermined speed;

an optical image forming element which continuously makes an image with said light beam deflected in said first direction by said deflector on an image surface;

a detector which detects said light beam passing through said optical image forming element and outputs a predetermined signal corresponding to the light beam; and an optical element arranged between said deflector and said detector to change an emission angle in correspondence to a change of a wavelength of light irradiated from the light source.

41. An exposure apparatus comprising:

a light source;

a deflector which deflects said light beam supplied from said light source to a first direction corresponding to a direction in which a rotatably formed reflection surface is rotated at a predetermined speed;

a second optical element extended out along said first direction to form an image with said light beam deflected from said deflector to a predetermined position so as to satisfy a function corresponding to a rotation of said reflection surface in said deflector;

a detector arranged at a distance optically equivalent to a position which said light beam passing through said second optical element is allowed to reach and in an area other than image area in which said light beam passing through said second optical element functions as an image to detect said light beam passing through said second optical element so as to output a predetermined signal; and an optical element arranged between said second optical element and said detector to change an emission angle in correspondence to a change of a wavelength of the light irradiated from said light source due to a change of a temperature with respect to said first direction and to shift a position which the light is allowed reach in a direction by an amount which is the same as a position shifting amount on a predetermined image surface generated by said second optical element due to a difference of the wavelength and having an opposite direction, and to guide the light having a wavelength which is changed due to a change of the temperature to the same position on the detecting surface of said detector in the case that the reflection surface of said deflector has the same rotational angle.

42. An exposure apparatus comprising:

a light source which irradiates light having a predetermined wavelength at a predetermined temperature;

a deflector which deflects light emitted from said light source to a first direction;

an image forming lens extended out in said first direction to form an image with the light deflected by said deflector on a predetermined image surface at a uniform speed;

a detector defined at a distance optically equivalent to said predetermined image surface, arranged at a position which the light passing through said lens is allowed to reach and in an area other than an image area among said predetermined image surface to detect the lights passing through said lens so as to output a predetermined signal; and an optical element arranged on an optical path between said lens and said detector, to change an emission angle in correspondence to a change of a wavelength of the light irradiated from said light source due to a change of a temperature with respect to said first direction, shifts a position which the light is allowed to reach in a direction by an amount which is the same as a position shifting amount generated by said lens due to a difference of the wavelength and having an opposite direction, and to reduce a difference of the image of a main scanning direction position at a position opposite to a writing position in said first direction generated by a difference of the writing timing caused by the light being different from a reference wavelength in the wavelength.

* * * * *